(12) United States Patent
Okabe et al.

(10) Patent No.: US 6,503,094 B1
(45) Date of Patent: Jan. 7, 2003

(54) CONNECTOR SUPPORTING STRUCTURE AND COUPLING STRUCTURE

(75) Inventors: Toshiaki Okabe, Shizuoka-ken (JP); Kenji Oishi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/685,589

(22) Filed: Oct. 11, 2000

(30) Foreign Application Priority Data

Oct. 22, 1999 (JP) ............................. 11-301645
Oct. 22, 1999 (JP) ............................. 11-301653
Oct. 22, 1999 (JP) ............................. 11-301666
Oct. 22, 1999 (JP) ............................. 11-301669

(51) Int. Cl.$^7$ ............................................. H01R 13/64
(52) U.S. Cl. ....................... 439/376; 439/594; 439/717
(58) Field of Search ................ 296/97.5; 362/144; 439/34, 542, 532, 714, 694, 567, 376, 131, 372, 571, 342, 717, 594

(56) References Cited

U.S. PATENT DOCUMENTS 4,363,511 A * 12/1982 Viertel et al. .............. 296/97.5
4,953,064 A * 8/1990 Viertel et al. .............. 296/97.5
5,011,212 A * 4/1991 Viertel et al. .............. 296/97.5
5,752,853 A * 5/1998 Curtindale .................. 296/97.5

* cited by examiner

Primary Examiner—Tho D. Ta
Assistant Examiner—Edwin A. León
(74) Attorney, Agent, or Firm—Finnegan, Henderson, Farabow, Garrett, & Dunner, L.L.P.

(57) ABSTRACT

According to a connector supporting structure of the invention, a connector has a concave portion formed from an outer side face of a connector housing up to a position leading to a terminal accommodating chamber is supported with a bracket having a convex portion which engages with the concave portion so as to position the connector and unit the connector with the bracket. Further, according to a connector coupling structure of the invention, a holder, which has an opening portion corresponding to a bracket mounting hole formed in a panel, is installed to a face on an opposite side to a face on which the bracket is to be mounted, of the panel. And further a mating connector is installed within the holder such that it is freely movable around a supporting shaft and when the bracket united with the connector is installed to the panel, the connector is advanced into the holder through the opening portion and coupled with the mating connector.

18 Claims, 23 Drawing Sheets

CONNECTOR SUPPORTING STRUCTURE AND COUPLING STRUCTURE

BACKGROUND OF THE INVENTION

The present invention relates to a connector supporting structure and coupling structure, more particularly to a connector supporting structure and coupling structure preferably used in automobile sun visor.

Generally, the sun visor is provided on a upper end of a front window of a driver's seat and a passenger seat on the side thereof of vehicle.

Some type of the sun visor has a vanity mirror and some type contains a lamp which enables the vanity mirror to be used even at night.

SUMMARY OF THE INVENTION

As a result of consideration of the inventors of the present invention, it has been found that in the sun visor having a lamp (not shown), a bracket 101 for fixing the sun visor to a vehicle body is provided at an end of a fixing shaft 102 and that bracket 101 is fixed on the vehicle body.

A connector 104 to be connected to a mating connector of wire harness placed in vehicle compartment is provided at an end of a lead wire 103 introduced from a shaft end 102*a* through the fixing shaft 102.

The connector 104 comprises a connector housing 106 for incorporating a terminal 105 fixed to an end of the lead wire 103 and a double-fitting spacer 107 which holds the terminal 105 from being loose from the connector housing 106 when not required and functions as a lance for detecting for an non-engagement of the terminal 105.

More specifically, the double-fitting spacer 107 is mounted to a spacer mounting hole portion 108 which goes through to a terminal accommodating chamber in the connector housing 106 so as to prevent the terminal 105 from being slipped out of the connector housing 106 and detect whether or not the terminal 105 is accommodated at a predetermined position in the connector housing 106.

Upon installing the sun visor having such a structure to the vehicle body, as shown in FIG. 27, a connector 104 connected to the sun visor is engaged with and connected to a mating connector 111 of wire harness disposed in a space between an inner panel 109 of the vehicle body and an outer panel 110 and after that, the bracket 101 is installed on and fixed to a mounting hole in the inner panel 109.

However, because the above described structure requires many parts for composing the connector 104 such as the double-fitting space 107, a number of assembly steps are required.

Further, because a lead wire 103 is introduced into a space between the shaft end 102*a* of the fixing shaft 102 and the connector 104, the lead wire 103 may be bit between the bracket 101 and the inner panel 109 when the bracket 101 is installed to the inner panel 109.

Further, before the bracket 101 is installed to the inner panel 109, a worker has to couple the aforementioned bracket 101 with the mating connector 111 provided in the space between the inner panel 109 and the outer panel 110 by feeling with sense of touch without visually making sure of the coupling. For the reason, any other person than a skilled worker cannot engage the connector 104 with the connector 111 easily. That is, because the connector coupling procedure is complicated, it takes much time for that coupling work.

Accordingly, the present invention has been achieved in considerations of the above described problems and an object of the invention is to provide a connector supporting structure in which the number of assembly steps can be reduced effectively by reducing the number of components and electric wire is prevented effectively from being bit by components. An another object of the invention is to provide a connector coupling structure which facilities coupling of the connector without manual operation of a worker and protects effectively the electric wire from being bit by the components, thereby securing a high reliability.

To achieve the above object, according to an aspect of the present invention, there is provided a connector supporting structure comprising: a connector having a connector housing wherein a terminal is accommodated in a terminal accommodating chamber provided in the connector housing and a concave portion is formed from an outer side face of the connector housing up to a position leading to the terminal accommodating chamber; and a bracket having a convex portion for engaging with the concave portion so as to position the connector and unit the connector therewith.

Further, according to another aspect of the present invention, there is provided a connector coupling structure, comprising: a bracket for fixing a subsidiary device to a panel; a first connector having a concave portion to be engaged with a convex portion formed on the bracket and to be united with the bracket by engaging the concave portion with the convex portion; a holder having an opening and to be mounted on a face at an opposite side to a face on which the bracket is mounted of a panel, with the opening portion positioned at a position corresponding to a bracket mounting hole formed in the panel; and a second connector to be installed freely movably around a supporting shaft within the holder and coupled with the first connector, wherein when the bracket united with the first connector is installed to the panel, the first connector is advanced into the holder through the opening portion and coupled with the second connector.

DETAILED DESCRIPTION OF THE PREFERRED EMBODIMENT

Hereinafter, the preferred embodiment of the connector supporting structure and connector coupling structure of the present invention will be described in detail with reference to the accompanying drawings.

This embodiment will be described about an example in which the connector supporting structure and coupling structure of the present invention is applied to the sun visor (auxiliary equipment) provided on an upper end of a front window along a driver's seat and a passenger seat on the side thereof.

More specifically, in the connector supporting structure, the connector provided at a front end of a lead wire to be connected to a lamp provided on the sun visor is coupled with a bracket for fixing the sun visor to the vehicle body.

Further, according to the connector coupling structure of the present invention, the connector is united with the bracket for fixing such a sun visor to the vehicle body, and then, that connector is coupled with a mating connector provided in the holder mounted on the vehicle body at the same time when the sun visor is installed onto the vehicle body.

First, the connector supporting structure will be described.

As shown in FIGS. 1 to 5, the connector supporting structure of this embodiment comprises a bracket 3 installed at an end of a fixing shaft 2 for supporting the sun visor 1 and a first connector 4 coupled with this bracket 3.

Figure 6A:
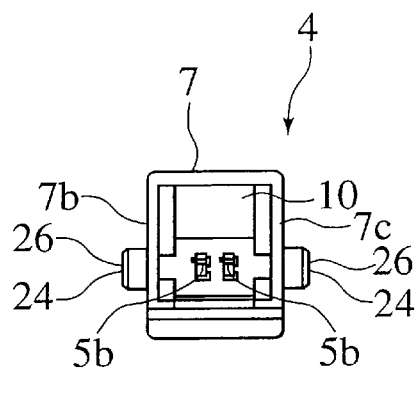
FIG. 6A is a front view of the first connector according to the embodiment.
Figure 6B:
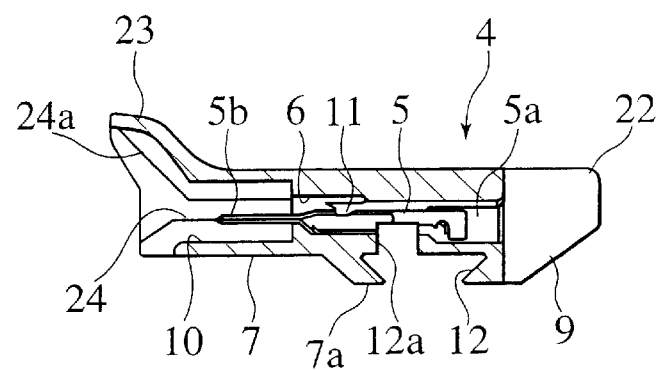
FIG. 6B is a sectional view thereof and FIG. 6C is a plan view thereof.
Figure 6C:
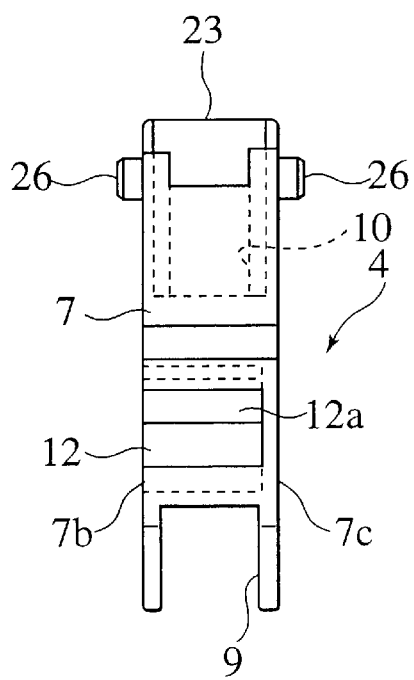
Figure 7:
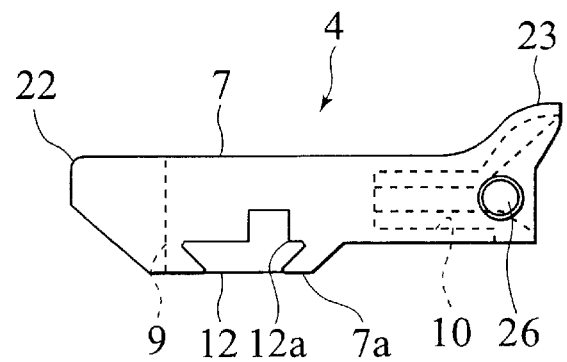
FIG. 7 is a side view of the first connector according to the embodiment.

As shown in FIGS. 6A to 7, the first connector 4 comprises a terminal 5 and a connector housing 7 having a terminal accommodating chamber 6 for accommodating this terminal 5. The first connector 4 is coupled with a bracket 3, will be described later, so that it is integrated with the bracket 3.

Figure 4:
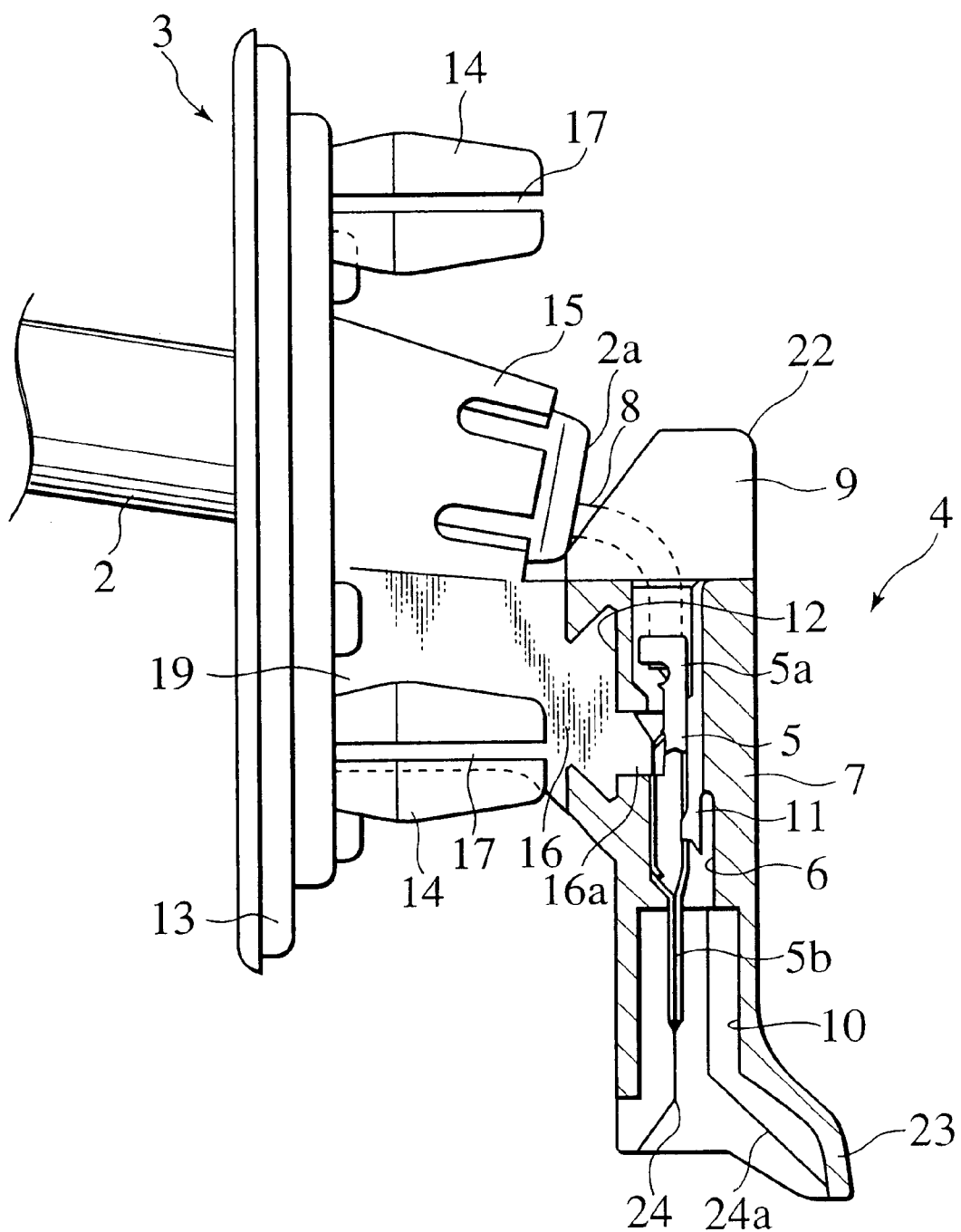
FIG. 4 is a partially broken side view of a state in which the first connector is coupled with the bracket according to the embodiment.

As shown in FIG. 4, the terminal 5 is pressed into a terminal accommodating chamber 6 formed in the connector housing 7 and accommodated therein. As a result, the terminal 5 is connected to a lead wire 8 introduced from the sun visor 1 and a mating terminal 42 (see FIG. 16) of the second connector 20 which is a mating connector of a wire harness placed on the vehicle body.

Figure 5:
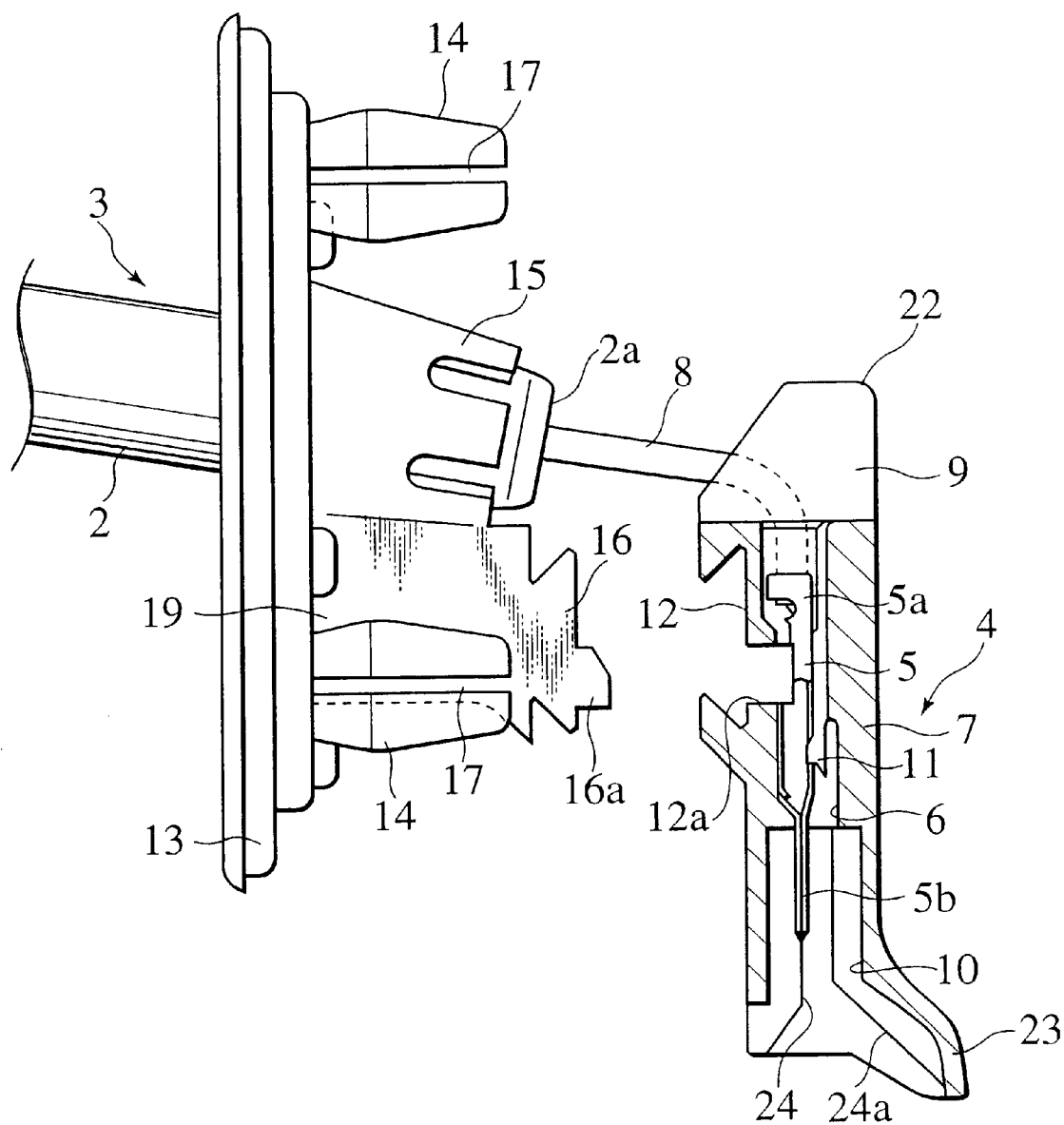
FIG. 5 is a partially broken side view of the connector supporting structure showing a state before the first connector is coupled with the bracket according to the embodiment.

That is, an end of the lead wire 8 which is inserted through the fixing shaft 2 and introduced from a shaft end 2a and is to be connected to a lamp provided on the sun visor 1 as shown in FIGS. 4, 5 is crimped to an end portion 5a of the terminal 5. A mating terminal 42 of a second connector 20 is connected to other end portion 5b of the terminal 5.

As shown in FIGS. 6A to 7, the connector housing 7 is formed by integral molding using insulated resin material and contains a terminal accommodating chamber 6 for accommodating the terminal 5, a lead wire guide groove portion 9 for guiding a lead wire 8 introduced from the shaft end 2a into the terminal accommodating chamber 6, a connector engaging hole portion 10 which a mating connector is inserted into and engaged with and a lance 11 for preventing the terminal accommodated in the terminal accommodating chamber 6 from being slipped out.

The terminal accommodating chamber 6 accommodates the terminal 5 which is pressed therein.

In the terminal accommodating chamber 6, a lance 11 acting as a primary engaging lance is formed in the shape of cantilever beam in order to stop the terminal 5 from being slipped out and detect an insertion condition of the terminal 5 into the terminal accommodating chamber 6.

The lead wire guide groove portion 9 is formed at a front end of the connector housing 7 and opposes the shaft end 2a nearby such that the lead wire 8 introduced from the shaft end 2a is kept inside and introduced to the end portion 5a of the terminal 5 accommodated in the terminal accommodating chamber 6.

The connector engaging hole portion 10 is formed in a rear end of the connector housing 7 and a mating connector (second connector 20) is inserted therein so that it engaged with the hole and then a mating terminal 24 is connected to the other end portion 5b of the terminal 5.

As shown in FIGS. 6A to 7, the connector housing 7 has a concave portion 12 formed so as to join a convex portion 16 formed in the bracket 3, which will be described later, so that it is integrated with the bracket 3.

The concave portion 12 is formed so as to engage with the convex portion 16 by sliding from a direction substantially perpendicular to a protruding direction of the convex portion 16 or as a dent in a so-called wedge form such that an opening width in an outside face 7a of the connector housing 7 is expanded gradually as it goes inward thereby providing an inverted trapezoidal shape. Then, part 12a of the concave portion 12 is formed further inwardly so that it reaches a position just near the terminal accommodating chamber 6 in which the terminal 5 is accommodated.

As shown in FIG. 6C, the concave portion 12 is formed by cutting out part of a side face 7b of the connector housing 7 so that it is formed up to near the other side face 7c opposing the side face 7b. In other words, the concave portion 12 is not formed in an entire width of the connector housing 7.

As shown in FIGS. 6B, 7, the connector housing 7 has a connector insertion force reducing portion 22 to reduce an insertion force which may occur when the first connector 4 is engaged with the second connector 20 provided in a holder 21, which will be described later.

The connector insertion force reducing portion 22 is formed at an end portion (rear end for insertion into the holder 21) of the connector housing 7 in which the lead wire guide groove 9 is formed, in a circular shape for reducing friction resistance with an inner wall of the holder 21.

As shown in FIGS. 6A to 7, the connector housing 7 has a connector pick-up portion 23 for automatically introducing the second connector 20 into the connector engaging hole portion 10 of the first connector 4.

The connector pick-up portion 23 is formed so as to protrude to an opposite side to a side in which the concave portion 12, for enlarging the opening width of the connector engaging hole portion 10 at its opening end, is formed, at the other end portion (front end for insertion into the holder 21) of the connector housing 7, in which the connector engaging hole portion 10 is formed. Because the connector pick-up portion 23 is formed by protruding part of the other end portion of the connector housing 7 upward, the opening width of the connector engaging hole portion 10 at the opening end is enlarged, thereby making it possible to pick up the second connector 20 by means of the connector pick-up portion 23 securely.

As shown in FIGS. 6A to 6C, the connector housing 7 has guide grooves 24, 24 for guiding the second connector 20 to the connector engaging hole portion 10.

The guide grooves 24, 24 guide portions 25, 25 (see FIG. 19) formed on the second connector 20 to inside and is formed in both sides of the connector engaging hole portion 10 in the form of a straight groove having a substantially U-shaped section. Then, opening ends of the guide grooves 24, 24 are formed wider so as to guide the guide portions 25, 25 into the grooves smoothly.

Further, as shown in FIGS. 6, 7, the connector housing 7 has guide protrusions 26, 26 for guiding the first connector 4 into the second connector 20 by inserting the first connector 4 into the holder 21 such that it is in a sliding contact with a guide face (not shown) of the connector guide portion formed on an inner wall of the holder 21, which will be described later. These guide protrusions 26, 26 are provided so as to protrude from both side faces of the connector housing 7 as a cylindrical protrusion having a small height.

Figure 8A:
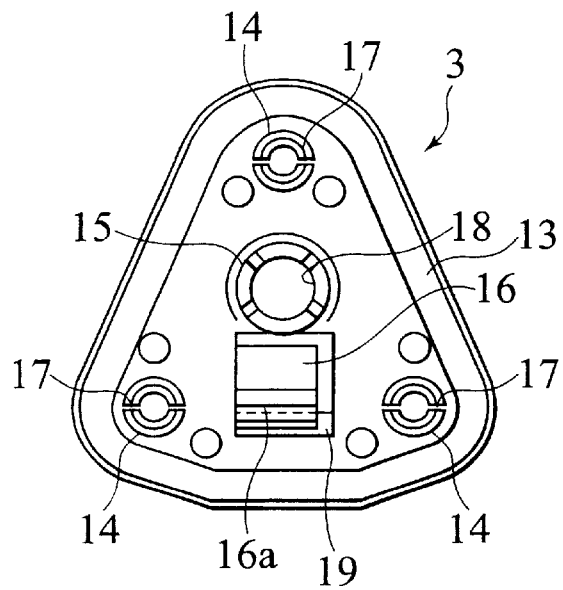
FIG. 8A is a plan view of the bracket according to the embodiment.
Figure 8B:
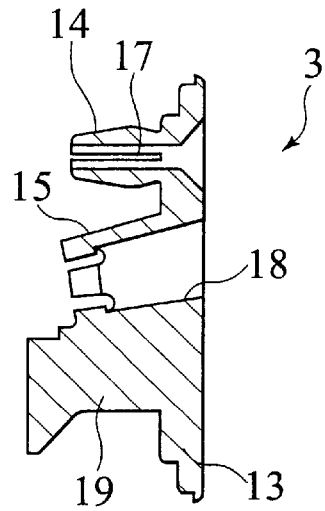
FIG. 8B is a sectional view thereof and FIG. 8C is a front view thereof.
Figure 8C:
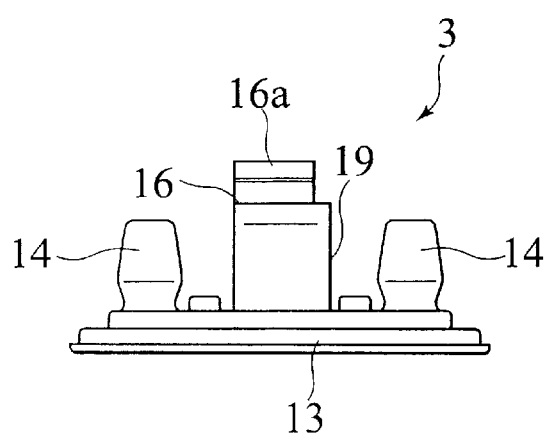
Figure 9:
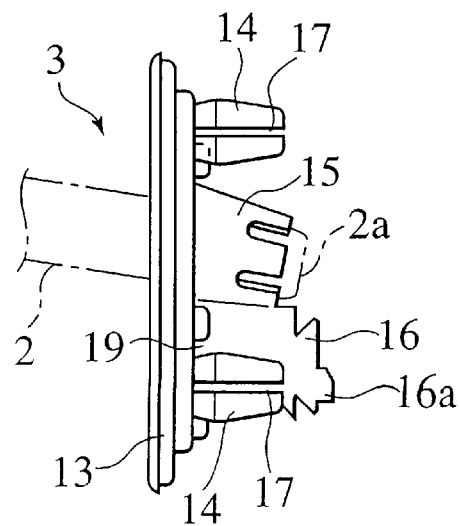
FIG. 9 is a side view showing a state in which the bracket is installed on an end of a fixing shaft according to the embodiment.

On the other hand, as shown in FIGS. 8A to 9, the bracket 3 is comprised of a main body portion 13, fixing member 14 for fixing this main body portion 13 to an inner panel (not shown) of the vehicle body, a shaft fixing portion 15 in which the fixing shaft 2 is pressed in and fixed and a convex portion 16 which engages with the concave portion 12 formed in the connector housing 7.

The fixing members 14 are provided near each vertex of the main body portion 13 which is substantially rectangular. the fixing members 14 are formed in a substantially cylindrical shape in which part of a proximal portion thereof is larger in diameter than the other portion. Further, each of the fixing members 14 has a slit 17 formed so as to divide this cylinder to two sections from a front end thereof up to the proximal end. Consequently, the front end of each fixing member 14 is deformed within its elastic region with the proximal end of the divided semi-circular portion as a fulcrum. Therefore, if the fixing member 14 is inserted into a bracket mounting hole (not shown) having a relatively smaller diameter than a large diameter portion of the fixing member formed in the inner panel, the semi-circular portion is deformed so that prevention of the fixing member 14 from being slipped out of the bracket mounting hole is carried out.

As shown in FIGS. 8A to 8C, the shaft fixing portion 15 is provided substantially in the center of the main body portion 13 so as to protrude and has a shaft fixing hole 18 in which the fixing shaft 2 is inserted and fixed. The fixing shaft 2 is inserted into the shaft fixing hole 18 and pressed therein, so that it is fixed in the shaft fixing portion 15.

Figure 1:
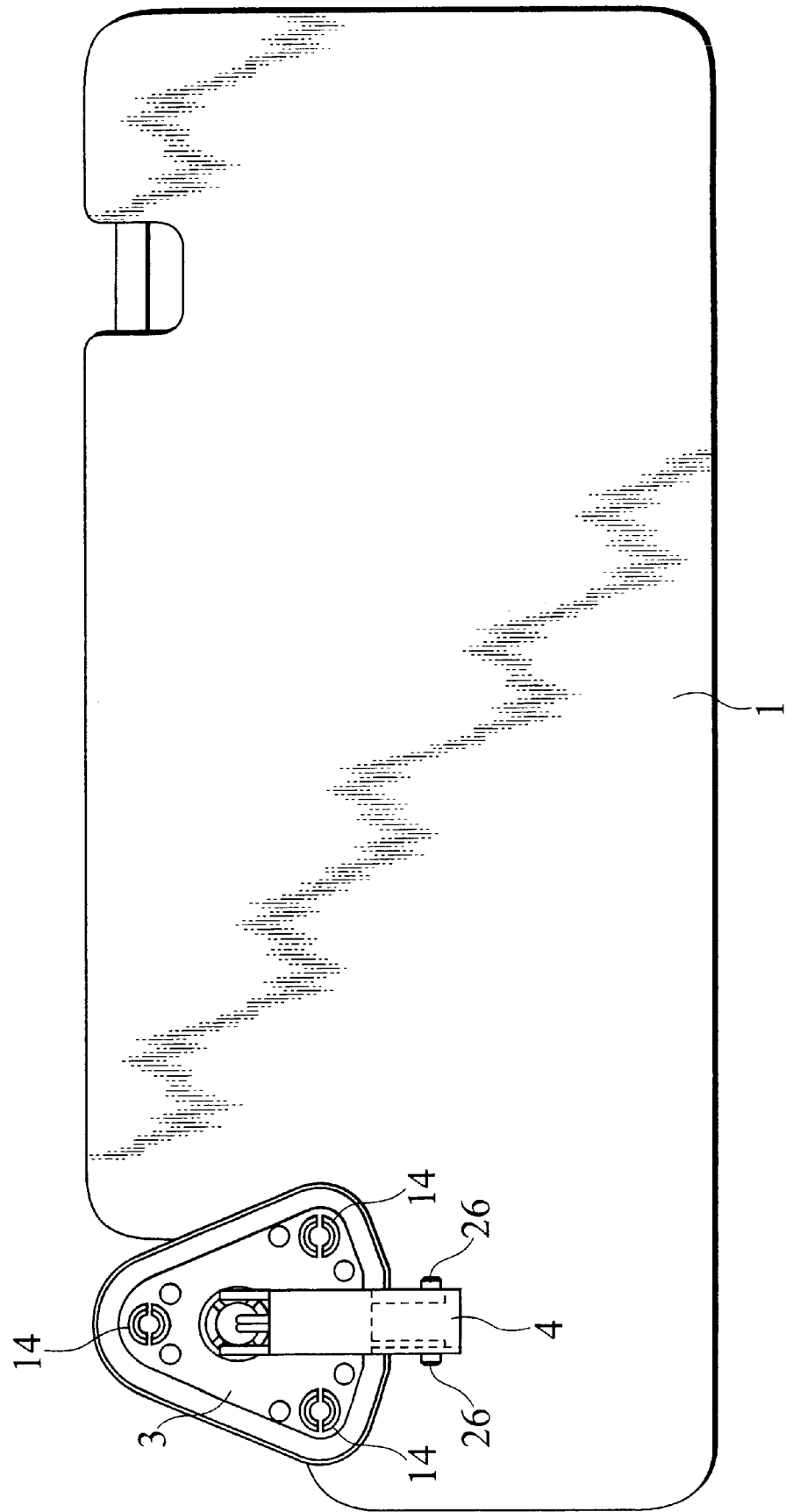
FIG. 1 is a plan view of a bracket coupled with a first connector according to an embodiment of the connector supporting structure and connector coupling structure of the present invention, the first connector being installed to a sun visor.
Figure 2:
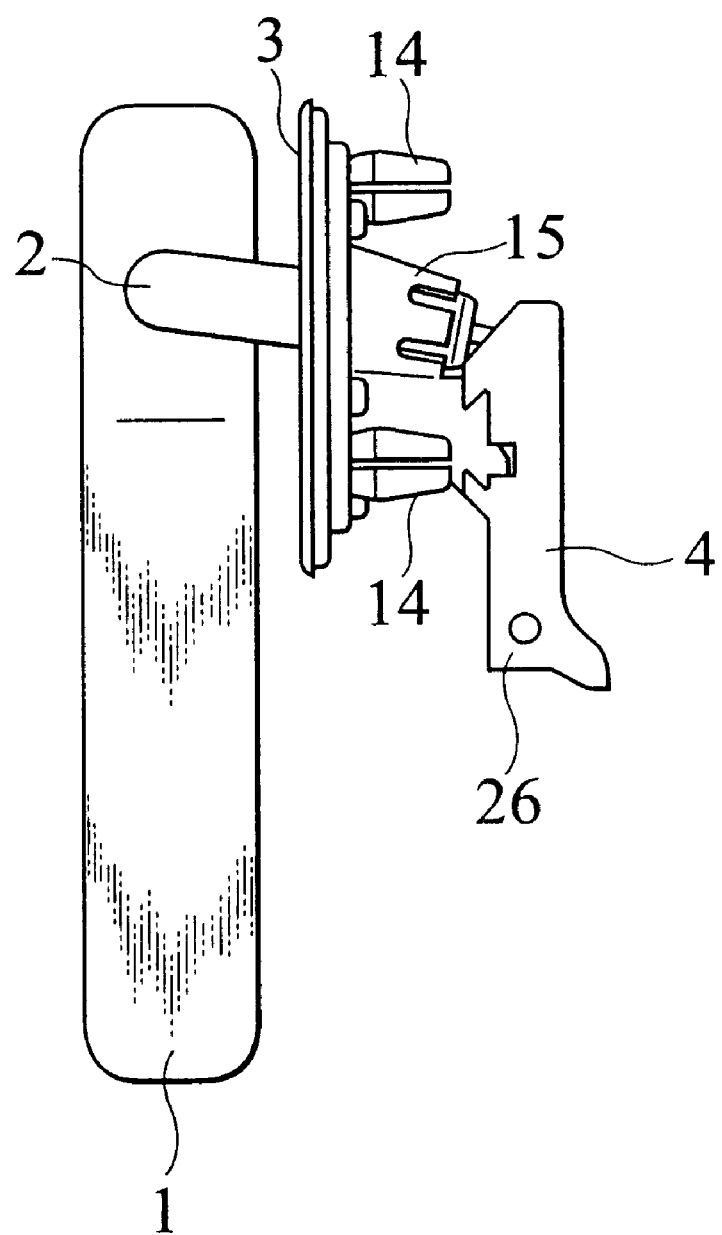
FIG. 2 is a side view of the bracket coupled with the first connector according to the embodiment.
Figure 3:
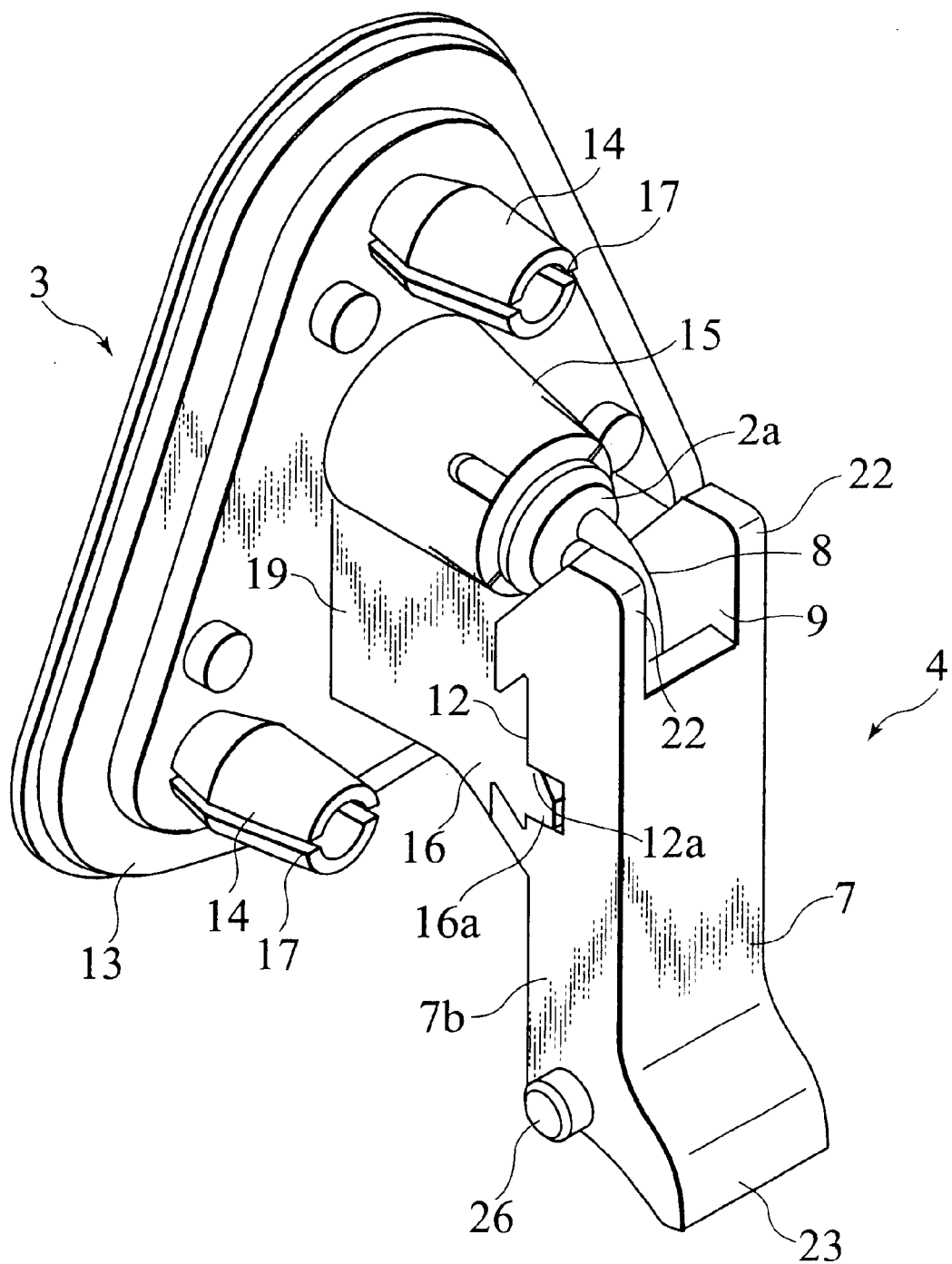
FIG. 3 is a perspective view of a state in which the first connector is coupled with the bracket according to the embodiment.

As shown in FIGS. 8A to 9, the convex portion 16 is provided at a front end of a connector supporting member 19 provided on the bracket so as to protrude in a convex shape engaging with the concave portion 12 formed in the connector housing 7. As shown in FIGS. 3, 4, a front end portion 16a of the convex portion 16 is fit to part 12a of the concave portion 12 so that it engages with the terminal 5 accommodated in the terminal accommodating chamber 6, so as to prevent the terminal 5 from being slipped out of the connector housing 7. That is, the convex portion 16 has not only a function for joining the first connector 4 with the bracket 3 so that they are integrated with each other, but also a function for preventing the terminal 5 from being slipped out of the connector housing 7. Further, the front end portion 16a of the convex portion 16 also functions as a secondary engaging lance for detecting whether or not the terminal 5 is accommodated at a predetermined position of the terminal accommodating chamber 6.

When the first connector 4 having such a structure is installed to the bracket 3, as shown in FIG. 5, the first connector 4 accommodating the terminal 5 connected to the lead wire 8 introduced from the shaft end 2a of the fixing shaft 2 is slid in a direction substantially perpendicular to the protrusion direction of the convex portion 16 with respect to the convex portion 16 formed at the front end of the connector supporting member 19 of the bracket 3, so that the concave portion 12 of the connector housing 7 engages with the convex portion 16.

Consequently, as shown in FIG. 4, if the concave portion 12 engages with the convex portion 16, the first connector 4 is joined to the bracket 3 so that they are integrated with each other. Further, the front end portion 16a of the convex portion 16 engages with part 12a of the concave portion 12 and then, the front end portion 16a engages with the terminal 5 accommodated in the terminal accommodating chamber 6, so that the terminal 5 is prevented from being slipped out of the connector housing 7.

As described above, because the first connector 4 is joined to the bracket 3 integratedly, the necessity of the double engaging spacer is eliminated. As a result, the quantity of the connector parts can be reduced and further, an exposure of the lead wire 8 introduced from the shaft end 2a of the fixing shaft 2 to outside is eliminated, so that the lead wire 8 is effectively prevented from being sandwiched between the bracket 3 and the vehicle body.

Further, because the first connector 4 is joined to the bracket 3 integratedly, installation work to the vehicle body is facilitated and an engagement between a mating connector (second connector 20) of wire harness placed in the vehicle body and the first connector 4 can be simplified. Further, a looseness between the first connector 4 and the vehicle body is eliminated thereby suppressing an occurrence of abnormal noise.

Needless to say, the shape of the convex portion 16 formed on the bracket 3 and the shape of the convex portion 12 formed in the connector housing 7 which engages therewith are not limited to the above described shapes, however a convex portion and concave portion each having other shape but equivalent function may be used appropriately.

Next, the connector coupling structure of this embodiment will be described.

As shown in FIGS. 1, 2, 17A to 18, the connector coupling structure of this embodiment comprises the bracket 3 installed at a front end of the fixing shaft 2 supporting the sun visor 1, the first connector 4 which is one connector joined to this bracket 3, the second connector 20 which is a mating connector to be coupled with the first connector 4 and the holder 21 for mounting the second connector 20 movably around a supporting shaft 36.

The structure of the first connector 4 and bracket 3 is the same as that already described about the connector supporting structure.

Figure 10A:
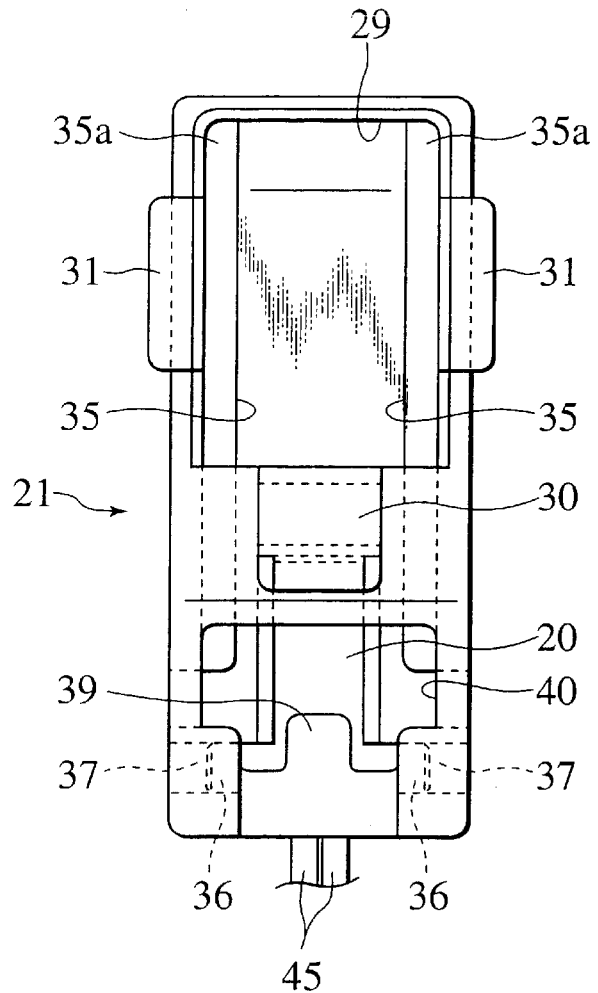
FIG. 10A is a plan view of a holder according to the embodiment and FIG. 10B is a front view thereof.
Figure 10B:
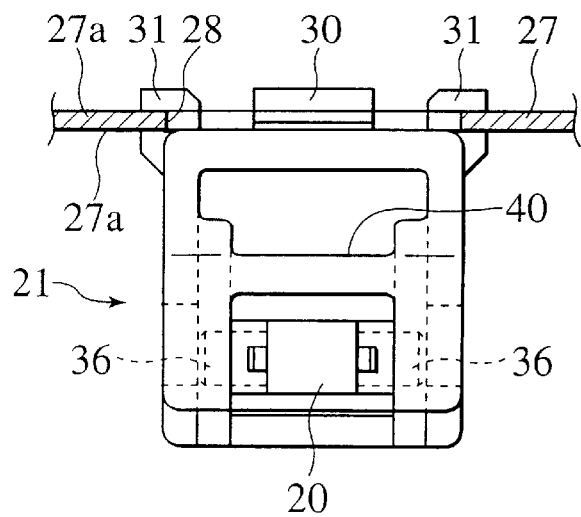
Figure 11:
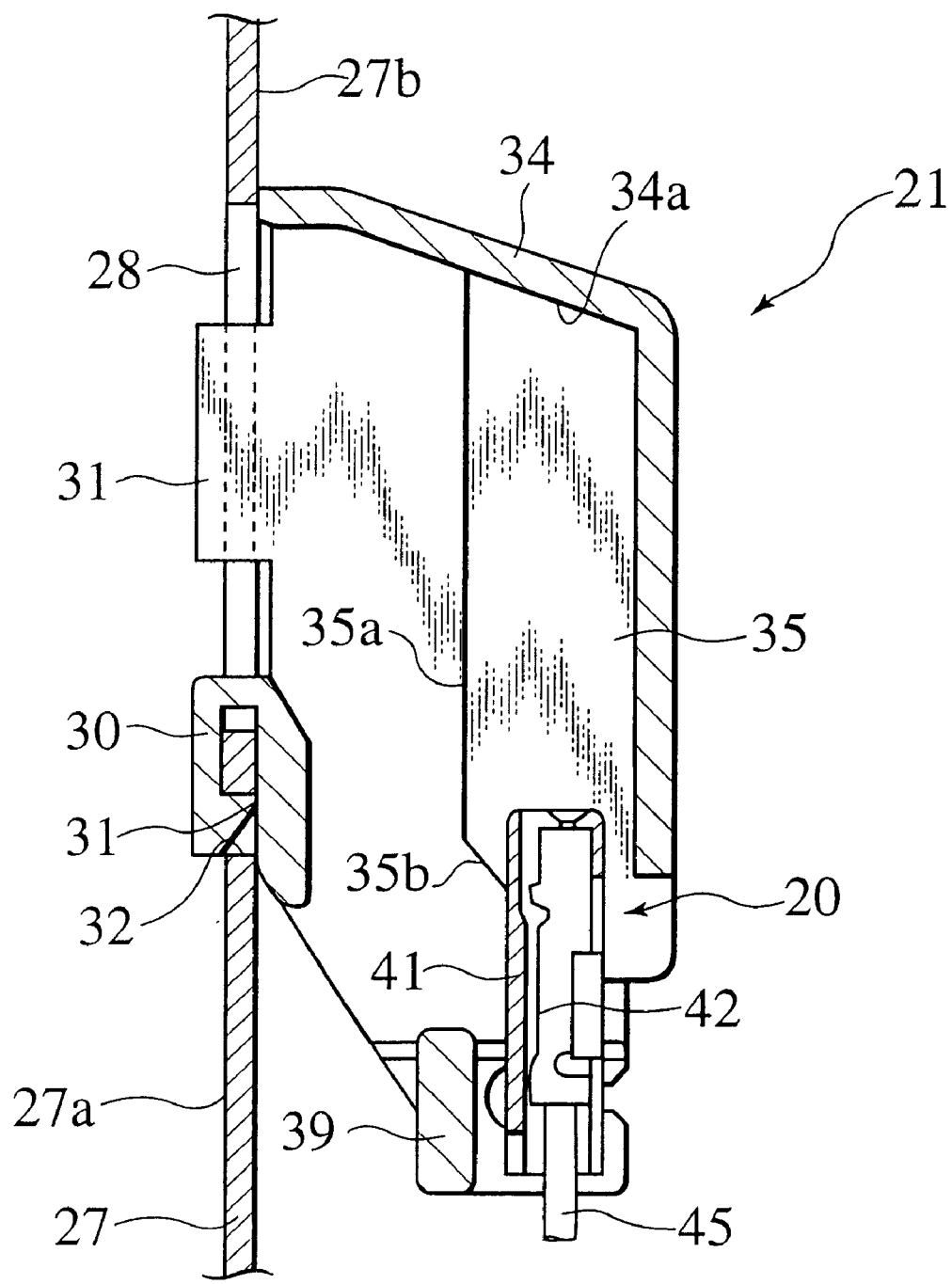
FIG. 11 is a sectional view of the holder according to the embodiment.

As shown in FIGS. 10A to 11, the holder 21 is installed on a rear face 27b which is an opposite side of a bracket mounting face 27a with an opening portion 29 thereof facing a bracket mounting hole 28 formed in the inner panel 27 corresponding to a portion in which the bracket 3 united with the first connector 4 is installed.

More specifically, as shown in FIGS. 9A to 15B, the holder 21 is formed in the form of a substantially rectangular box having the opening portion 29 as a connector insertion hole for allowing the first connector 4 to enter and accommodates the second connector 20, which will be described later, the shaft fixing portion 15, the connector supporting member 19 and first connector 4. The holder 21 has a hook 30 for installing the holder 21 to the inner panel 27 and a pair of fitting pieces 31, 31.

Figure 12:
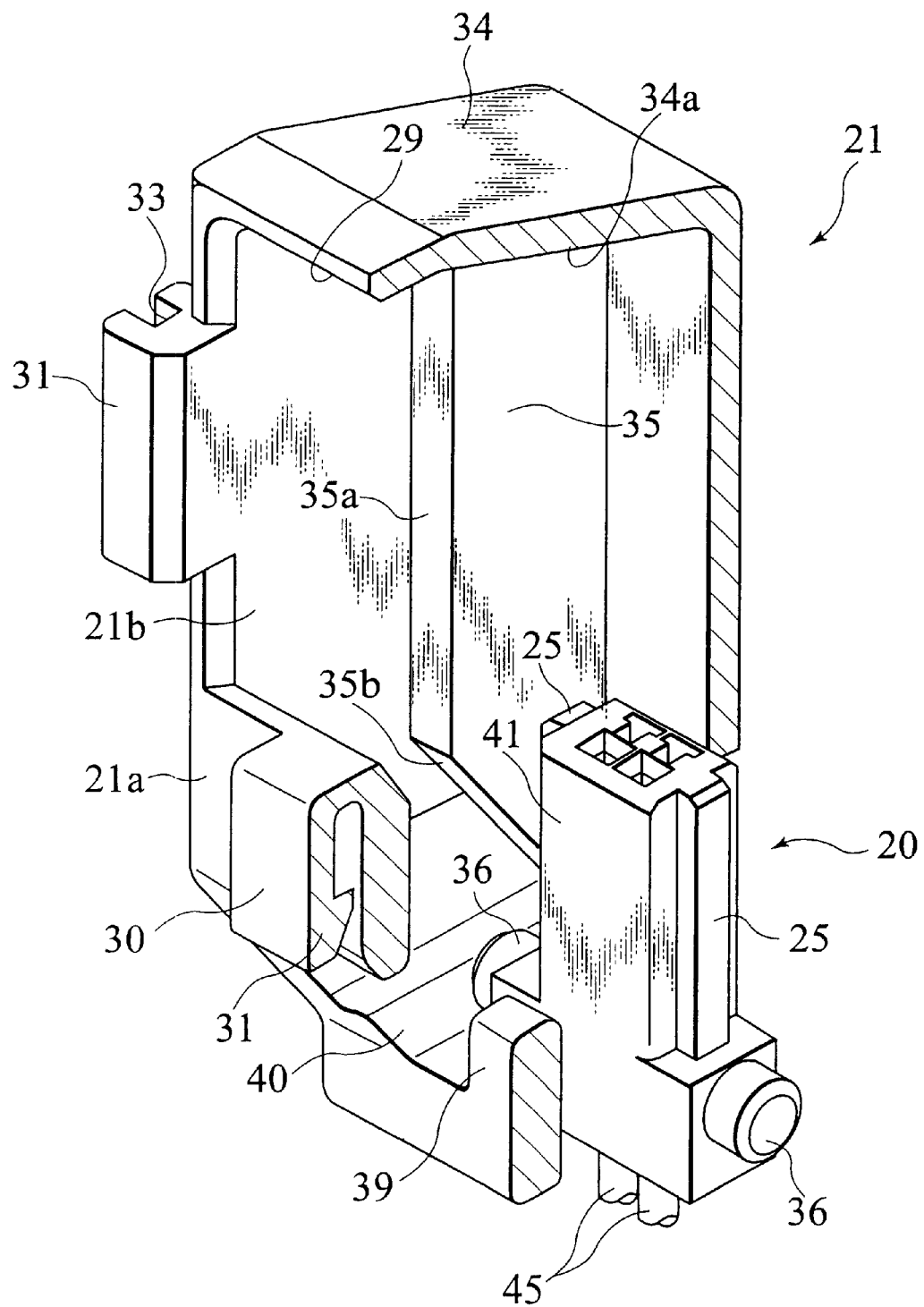
FIG. 12 is a partially broken perspective view of the holder according to the embodiment.
Figure 13:
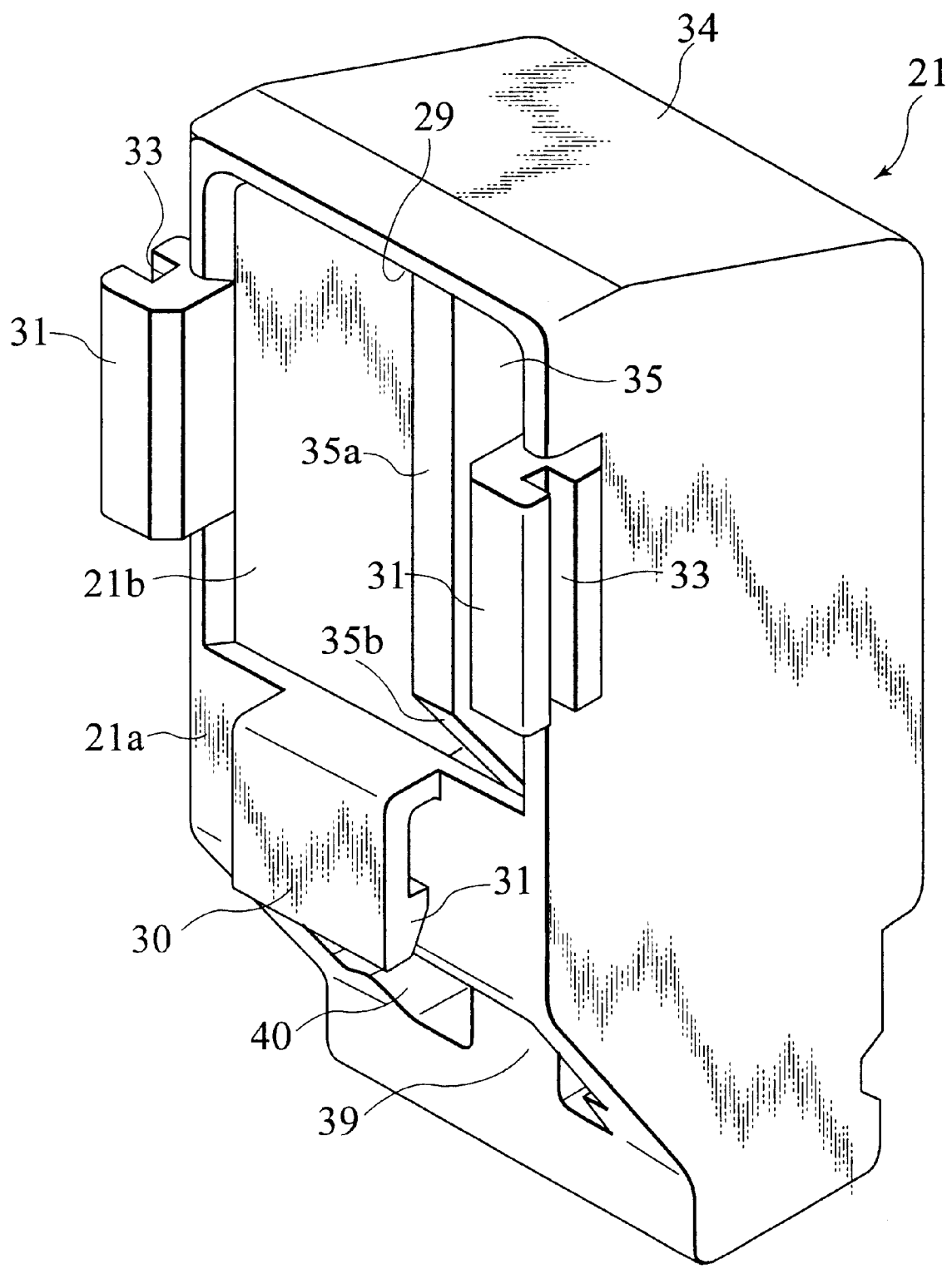
FIG. 13 is a perspective view of the holder according to the embodiment.
Figure 14A:
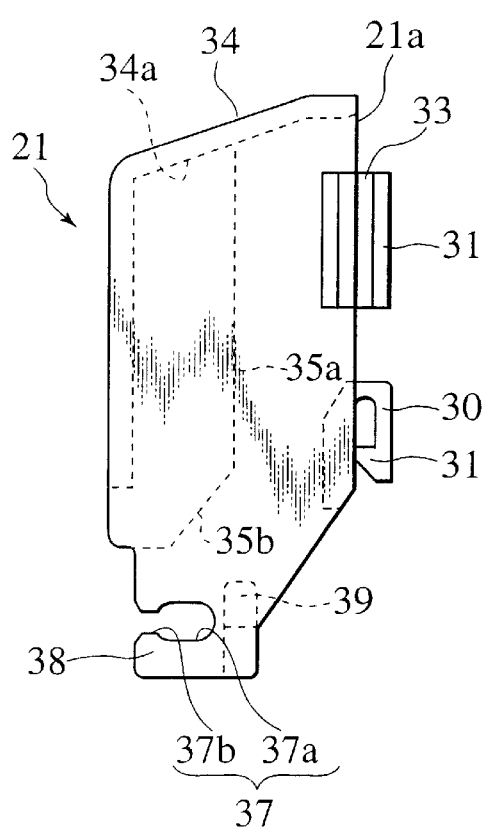
FIG. 14A is a side view of the holder according to the embodiment.
Figure 14B:
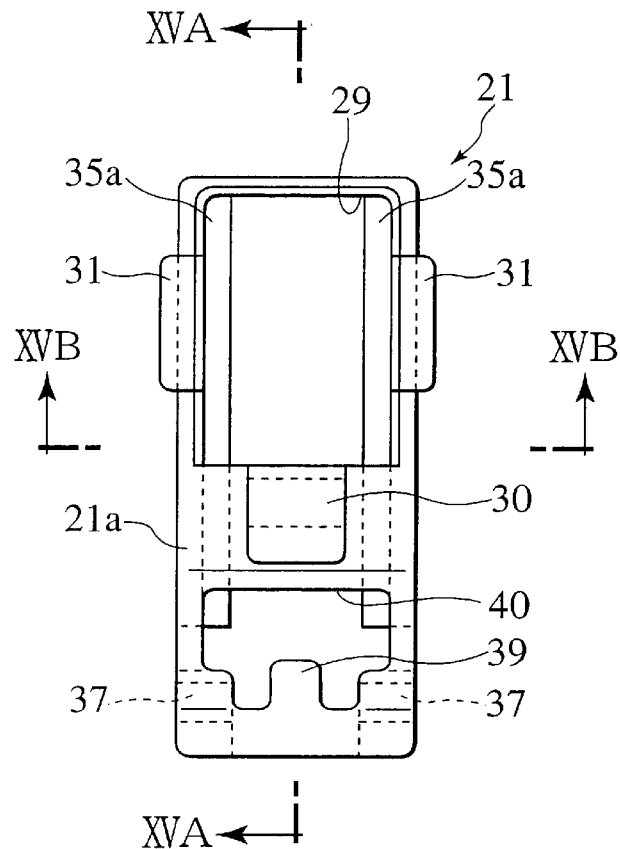
FIG. 14B is a plan view thereof and FIG. 14C is a front view thereof.
Figure 14C:
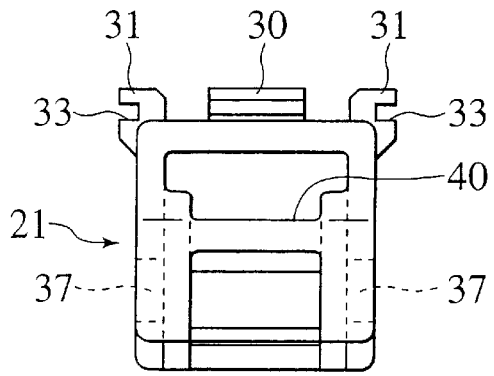
Figure 15A:
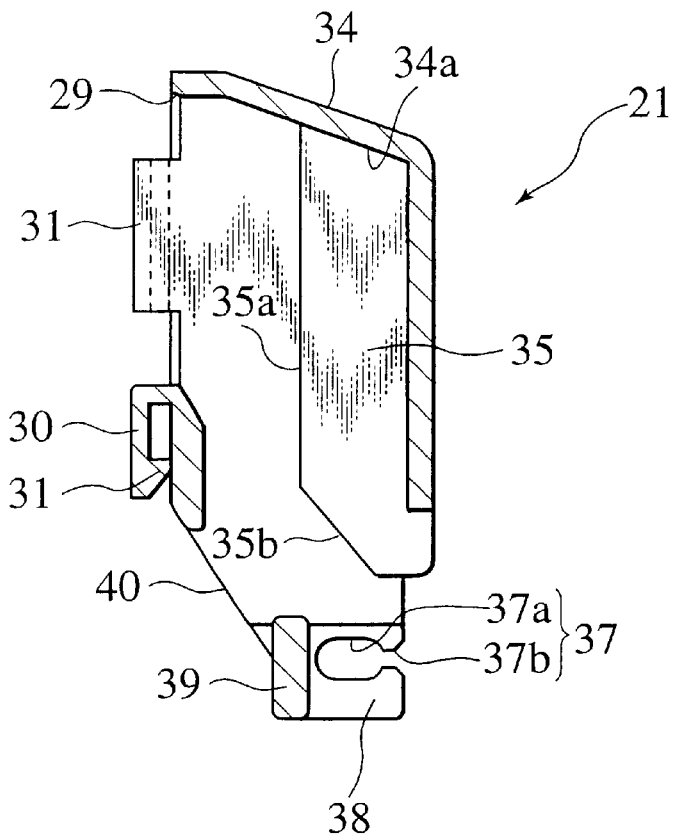
FIG. 15A is a sectional view taken along the line XVA—XVA of FIG. 14B
Figure 15B:
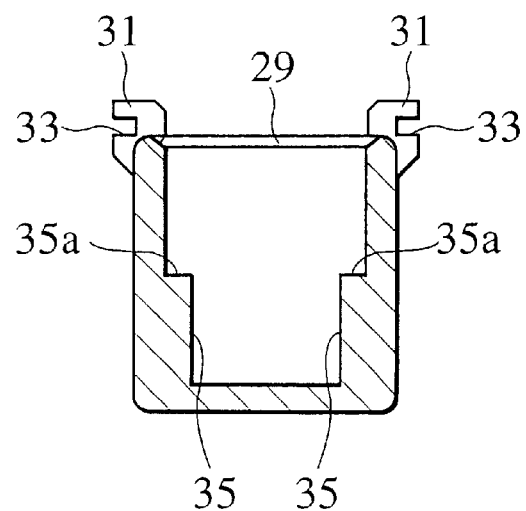
FIG. 15B is a sectional view taken along the line XVB—XVB of FIG. 14B.

The hook 30 is provided on a panel mounting face 21a in which the opening portion 29 is formed as shown in FIGS. 12, 13. The hook 30 is formed in the form of a substantially inverted L-shaped tongue. A hooking portion 31 formed at a front end thereof is inserted into a hooking hole portion 32 formed in the inner panel 27 as shown in FIG. 11 so as to be fit to the opening peripheral portion of the hooking hole portion 32. Consequently, the holder 21 is mounted and fixed to the inner panel 27.

A pair of the fitting pieces 31, 31 are provided on the aforementioned panel mounting face 21a on the opening periphery of the opening portion 29 as shown in FIGS. 12, 13. Each of the fitting pieces 31, 31 has a slit groove 33 having a substantially U-shaped section. Then, an opening peripheral portion of the bracket mounting hole 28 formed in the inner panel 27 is fit into the slit groove 33. That is, by fitting the opening peripheral portion of the bracket mounting hole in the inner panel 27 into the slit groove 33 in each fitting piece 31, the holder 21 is mounted on the inner panel 27.

The holder 21 has an inclined portion 34 for reducing connector coupling force F2 (see FIG. 21) which is an insertion force for engaging the first connector 4 with the second connector 20.

The inclined portion 34 is inclined in a direction in which the second connector 20 is installed as it goes from the panel mounting face 21a toward a bottom of the holder 21. Consequently, the connector insertion force reducing portion 22 of the first connector 4 comes into a sliding contact with an inclined inner wall 34a.

As shown in FIGS. 11, 12, the holder 21 contains connector guide portions 35, 35 for guiding the first connector 4 into the holder 21 up to the second connector 20.

The connector guide portions 35, 35 are formed so as to protrude from both the inner walls 21b which oppose each other in the holder 21 and each of the connector guide portions 35, 35 has guide faces 35a, 35b, which come into sliding contact with the guide protrusions 35a, 35b, provided at an upper end thereof.

Of these guide faces 35a, 35b, one guide face 35a is a face substantially parallel to the inner panel 27 while the other guide face 35b is an inclined face which is inclined to a side in which the second connector 20 is provided. By keeping the guide protrusions 26, 26 in sliding contact with these guide faces 35a, 35b, the first connector 4 is guided to the second connector 20.

Further, the holder 21 contains supporting shaft guide holes 37, 37 for guiding a pair of supporting shafts 36, 36 formed on the second connector 20 such that the second connector 20 is freely movable around the supporting shafts 36, 36, as shown in FIGS. 10A to 15B.

Figure 24:
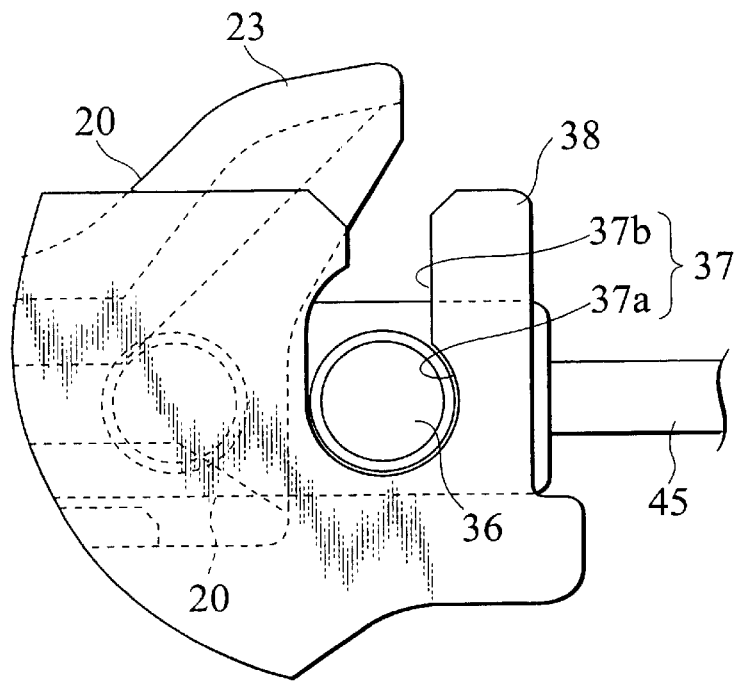
FIG. 24 is an enlarged side view of major parts of the second connector supporting portion in the connector engagement completion condition according to the embodiment.

As shown in FIG. 24, the supporting shaft guide holes 37, 37 is comprised of a circular hole portion 37a having substantially the same diameter as an outside diameter of each of the supporting shafts 36, 36 when the supporting shafts 36, 36 are pressed completely into the hole portion and an elongated hole portion 37b whose width decreases gradually from the circular hole portion 37a toward an opening end.

Figure 25:
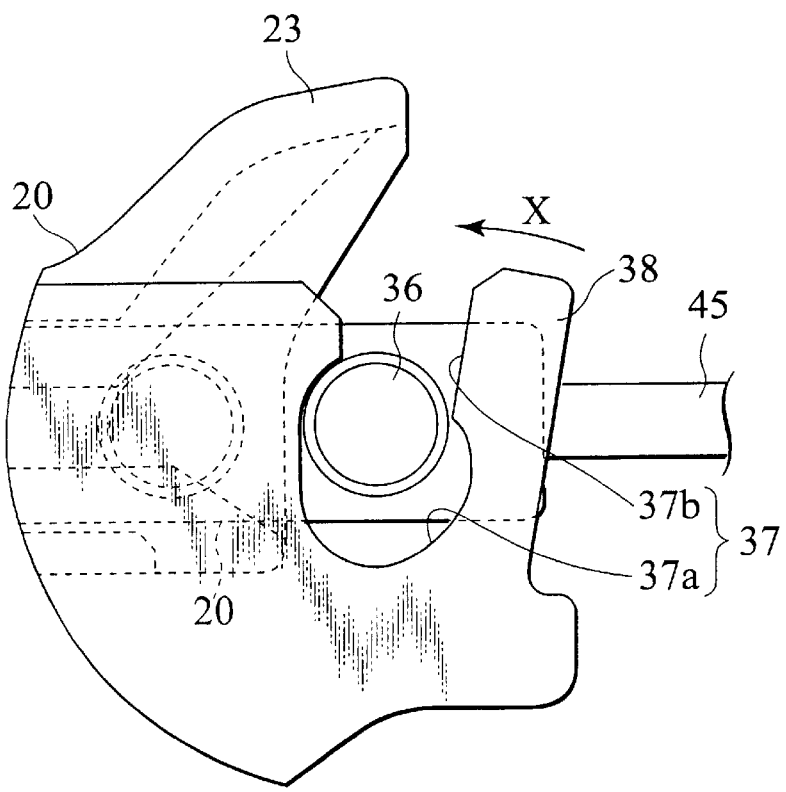
FIG. 25 is an enlarged side view of major parts of the second connector supporting portion in the connector engagement ensuring condition according to the embodiment.
Figure 26:
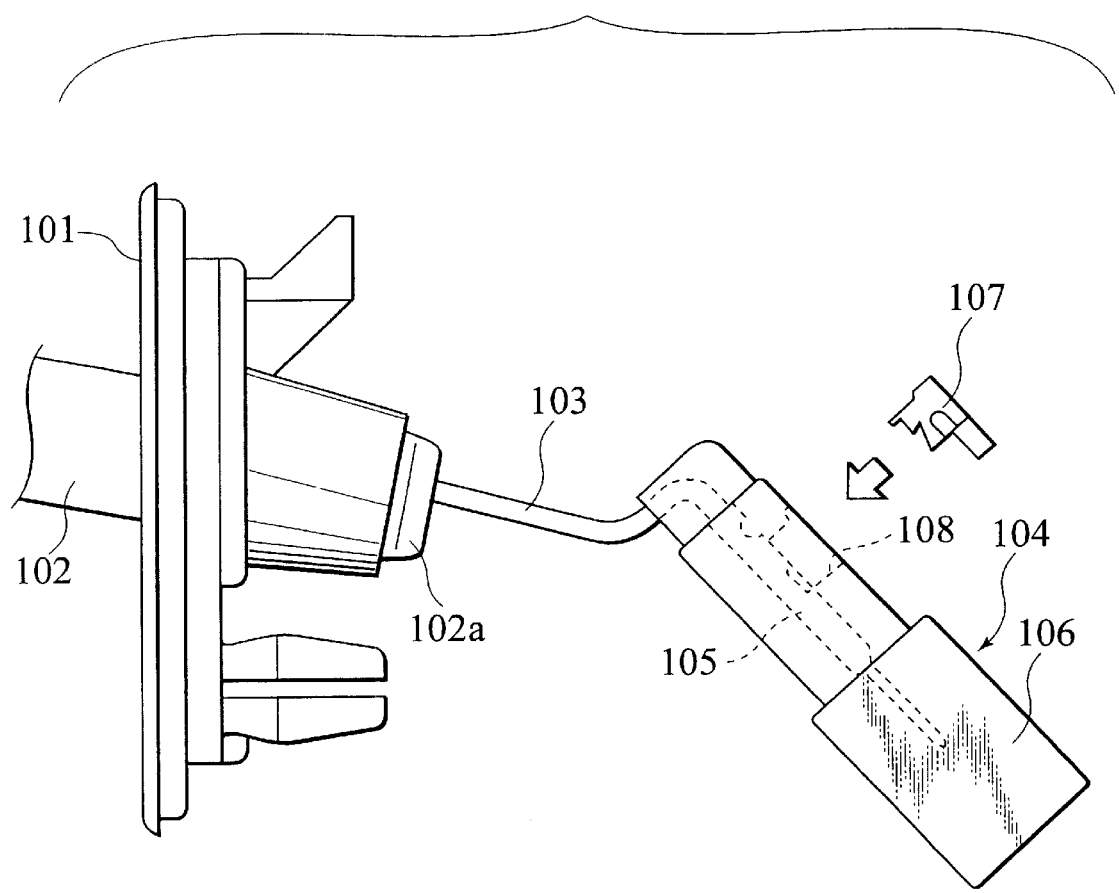
FIG. 26 is a side view showing a connector supporting structure concerning consideration of the inventors of the present invention.
Figure 27:
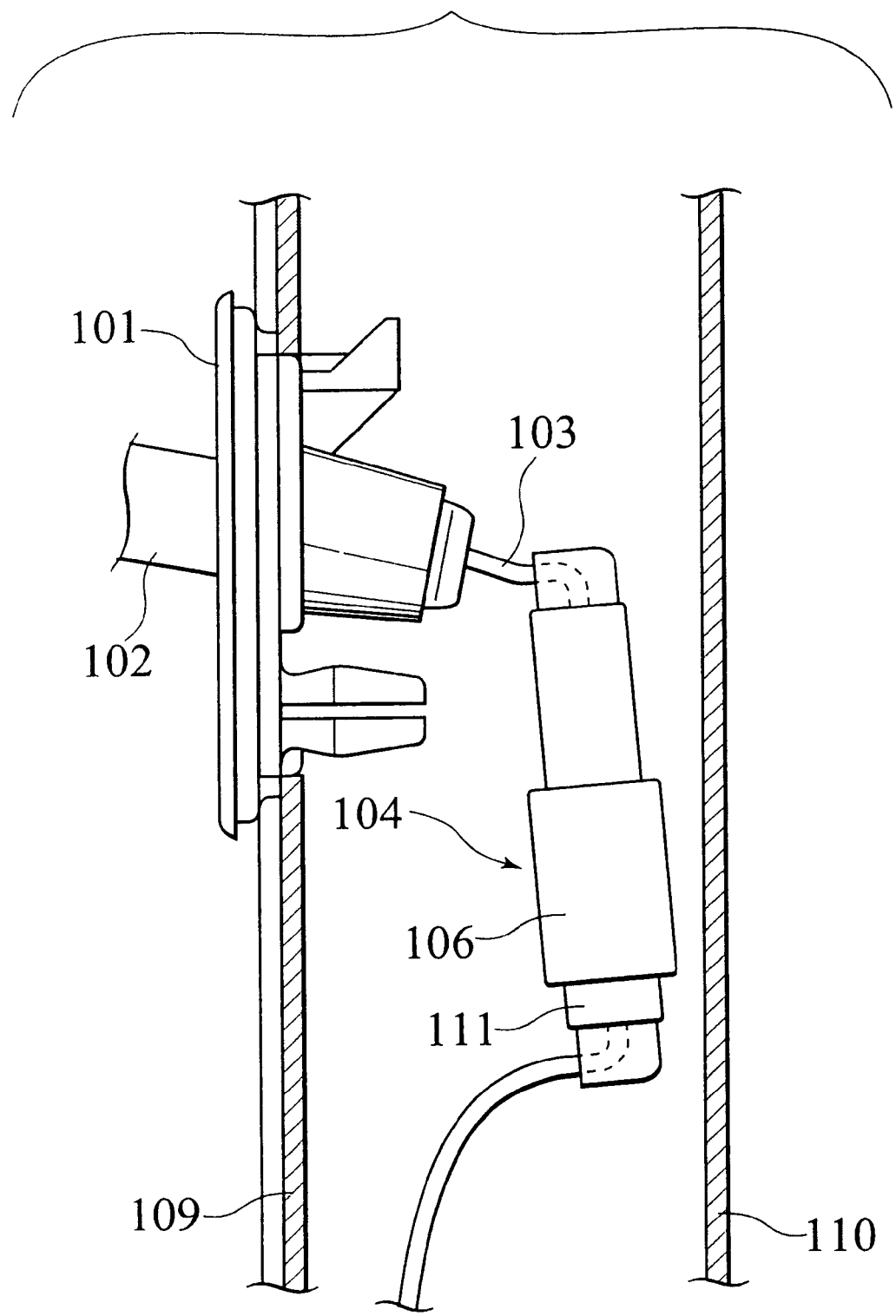
FIG. 27 is a partially broken side view of the connector supporting structure showing a state in which the bracket is fixed to the vehicle body and connected to a mating connector concerning the consideration of the inventors.

Further, as shown in FIGS. 24, 25, the holder 21 has a looseness preventing portion 38 for preventing a looseness between the coupled first connector 4 and second connector 20.

The looseness preventing portion 38 is so constructed that a free end thereof is deformable and it is urged in a direction of pressing the supporting shafts 36, 36 moved to the elongated hole portion having a smaller width (X direction indicated by arrow in FIG. 25) so as to suppress the looseness of the second connector 20. Meanwhile, the looseness preventing portion 38 forms part of each of the supporting shaft guide holes 37, 37.

The holder 21 contains a position restricting member 39 for restricting a movable upper limit end of the second connector 20, which is freely movable while guided by the supporting shaft guide holes 37, 37, as shown in FIGS. 10A to 15B.

The position restricting member 39 is formed in a rectangular tongue-like shape facing the opening hole portion 40 formed in the holder 21 and restricts the movable upper limit end of the second connector 20 by keeping an end portion thereof in contact with the second connector 20.

The second connector 20 has a connector housing 41 which enters the connector engaging hole portion 10 of the first connector 4 as shown in FIGS. 12 and 16 to 17C and the connector housing 41 accommodates a mating terminal 42 to be connected to the terminal 5 of the first connector 4.

The connector housing 41 is formed in a rectangular box-like shape which enters and engages with the connector engaging hole portion 10 of the first connector 4. Then, the connector housing 41 has guide portions 25, 25, which enter the guide grooves 24 formed in the first connector 4, provided on both side faces thereof.

The connector housing 41 has supporting shafts 36, 36 which are inserted into the supporting shaft guide holes 37, 37 formed in the holder 21 and guided thereby.

The supporting shafts 36, 36 are formed in the form of a low cylinder and provided on both side faces at a proximal end at an opposite side to a side thereof which engages with the first connector 4.

Figure 16:
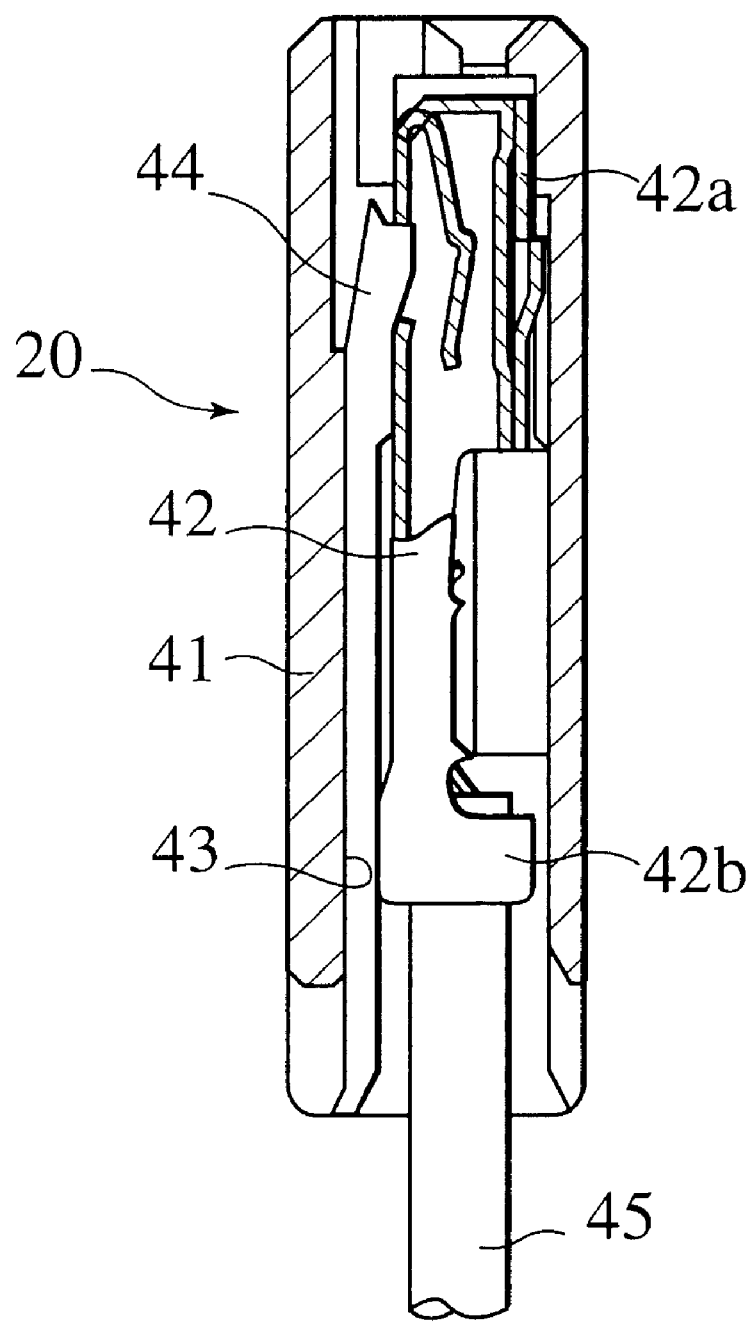
FIG. 16 is a sectional view of a second connector according to the embodiment.
Figure 17A:
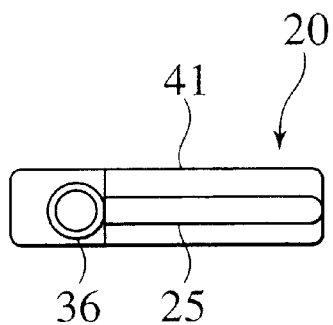
FIG. 17A is a side view of the second connector according to the embodiment.
Figure 17B:
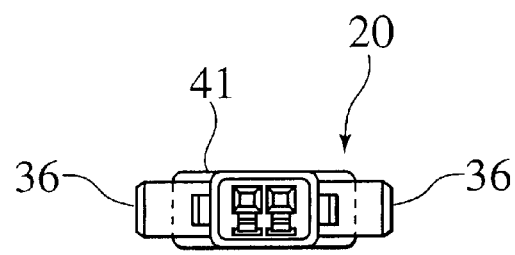
FIG. 17B is a front view thereof and FIG. 17C is a plan view thereof.
Figure 17C:
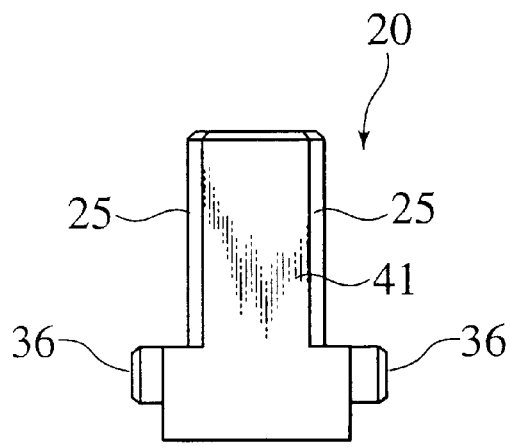

As shown in FIG. 16, a mating terminal 42 to be connected to the terminal 5 of the first connector 4 is accommodated in the terminal accommodating chamber 43 of the connector housing 41 as shown in FIG. 16.

The terminal accommodating chamber 43 contains a lance 44 which is a flexible elastic arm for preventing the mating terminal 42 from being slipped out of the connector housing 41 and detecting a mounting position of the mating terminal 42 with respect to the connector housing 41.

As shown in FIG. 16, the mating terminal 42 is a female terminal to be connected to the terminal 5 which is a male terminal of the first connector 4.

The mating terminal 42 is comprised of an end portion 42a which is a connecting portion to be connected to the terminal 5 of the first connector 4 and the other end portion 42b which is a wire crimping portion to be connected to the lead wire 45.

The first connector 4 and the second connector 20 having the above described structure are coupled with each other in the following manner.

First, in the connector supporting structure, as described above, the first connector 4 is coupled with the bracket 3.

Figure 18:
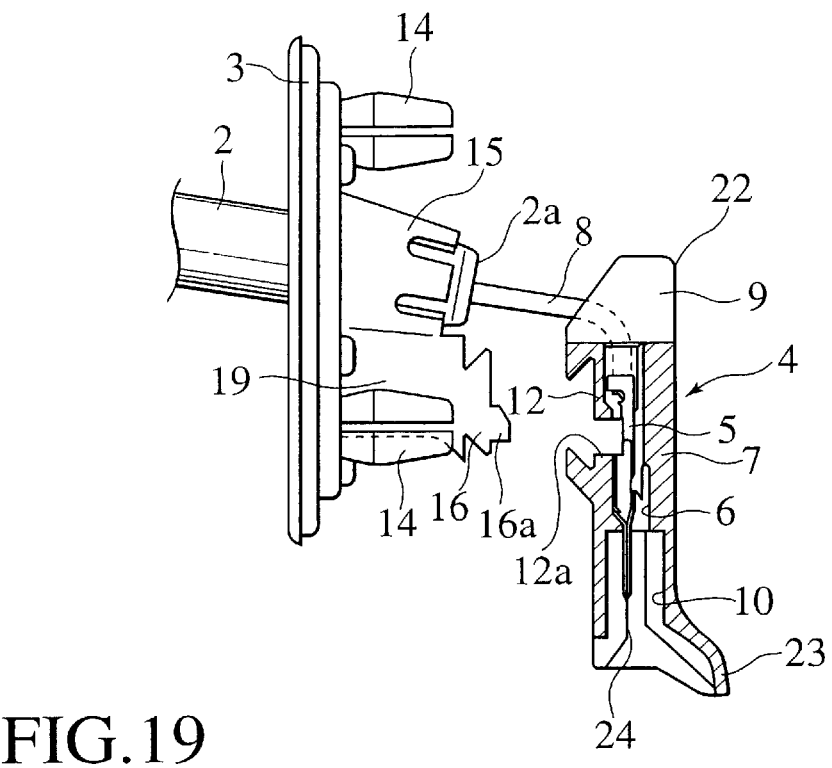
FIG. 18 is a side view having a partial section showing a state before the first connector is coupled with the bracket according to the embodiment.

That is, as shown in FIGS. 18, 4, the first connector 4 accommodating the terminal 5 connected to the lead wire 8 introduced from the shaft end 2a of the fixing shaft 2 is slid in a direction substantially perpendicular to the protruding direction of the convex portion 16 with respect to the convex portion 16 formed at a front end of the connector supporting member 19 of the bracket 3, so that the concave portion 12 of the connector housing 7 is engaged with the convex portion 16.

Consequently, as shown in FIG. 5, the concave portion 12 is engaged with the convex portion 16 so that the first connector 4 is united with the bracket 3 integratedly. Further, the front end portion 16a of the convex portion 16 engages with the part 12a of the concave portion 12, so that the front end portion 16a engages with the terminal 5 accommodated in the terminal accommodating chamber 6, thereby preventing the terminal 5 from being slipped out of the connector housing 7.

Figure 19:
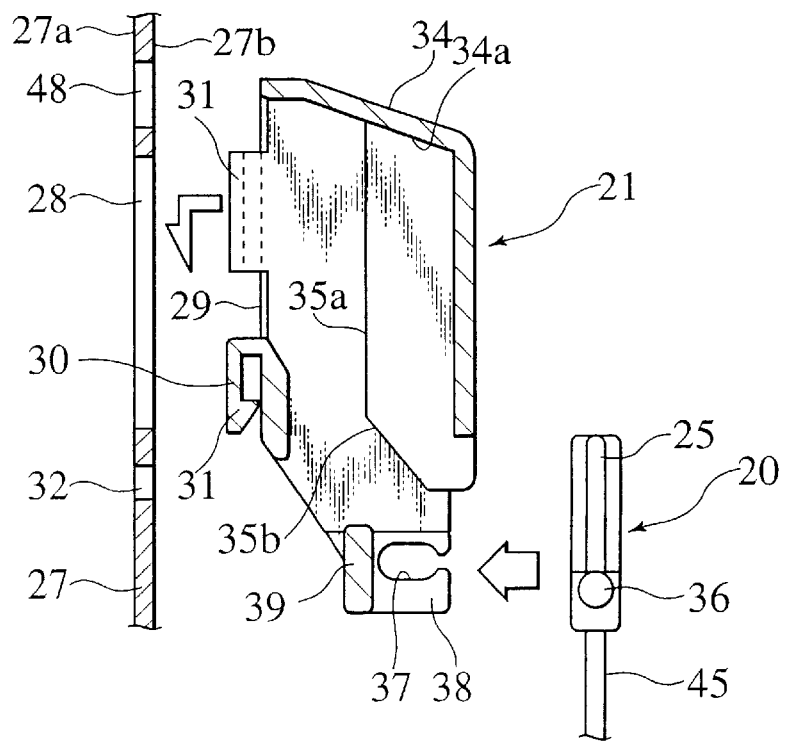
FIG. 19 is a sectional view showing a state in which the holder is installed to an inner panel according to the embodiment.

On the other hand, as shown in FIG. 19, the second connector 20 is installed to the holder 21.

More specifically, when installing the second connector 20 to the holder 21, first of all, the supporting shafts 36, 36 are inserted and fit to the supporting shaft guide holes 37, 37 formed in the holder 21.

Consequently, the second connector 20 is freely movable around the supporting shafts 36, 36 with respect to the holder 21.

Next, the holder 21 is placed between the inner panel 27 of the vehicle body and a space 47 of the outer panel 46 (see FIG. 20) and installed on the inner panel 27.

When installing the holder 21 to the inner panel 27, it is installed on a rear face 27b on an opposite side to the bracket mounting face 27a with the opening portion 29 facing the bracket mounting hole 28 formed in the inner panel 27. At this time, the hooking portion 31 of the hook 30 formed on the holder 21 is inserted into and engaged with the hooking hole portion 32 formed in the inner panel 27 and at the same time, the opening peripheral portion of the bracket mounting hole of the inner panel 27 is fit to the slit grooves 33 of a pair of the fitting pieces 31, 31. Consequently, the holder 21 is mounted on the inner panel 27.

Figure 20:
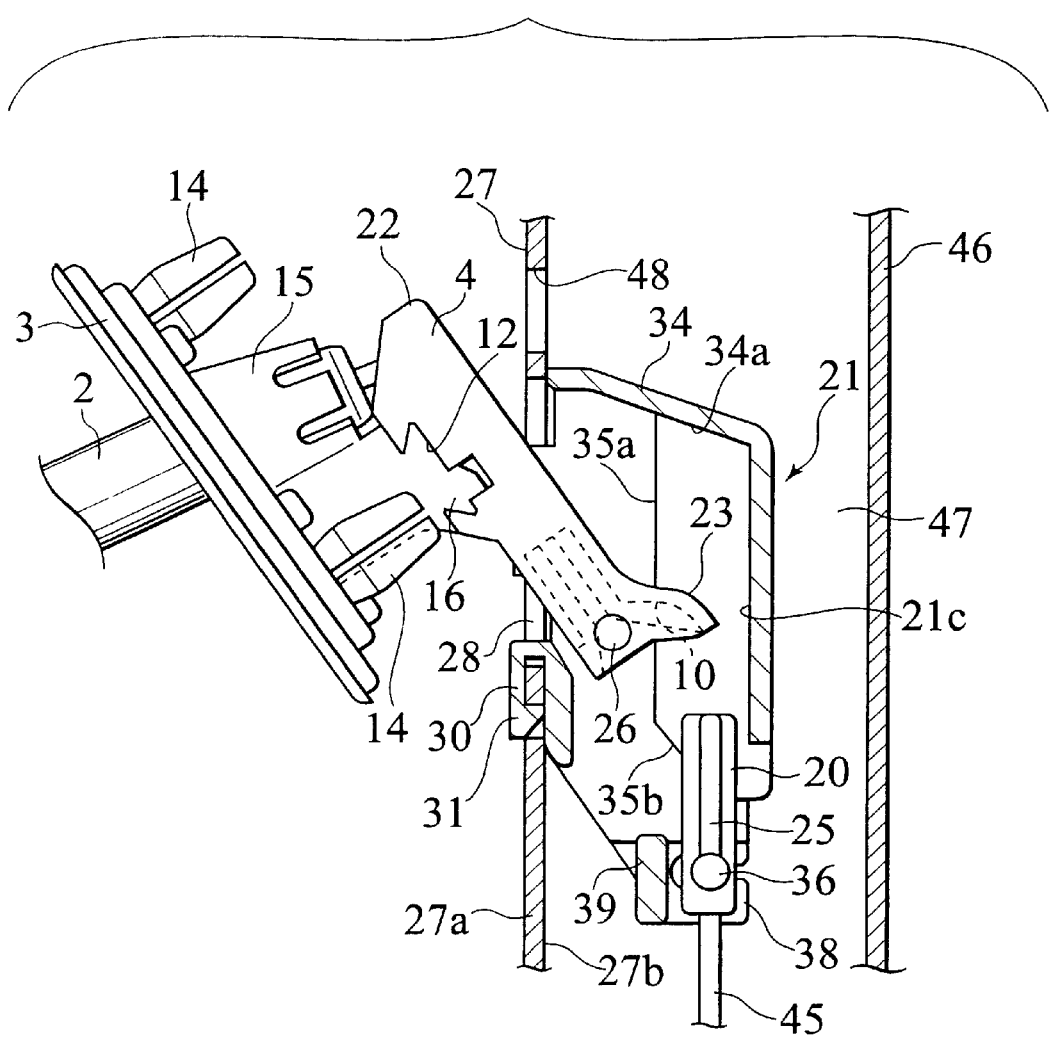
FIG. 20 is a sectional view of connector engagement start condition showing an operation for engaging the first connector coupled with the bracket with the second connector in the holder according to the embodiment.

Next, as shown in FIG. 20, after the first connector 4 is united with the bracket 3, the sun visor 1 is fixed to the vehicle body.

That is, the first connector 4 united with the bracket 3 is advanced into the holder 21 through the bracket mounting hole 28 in the inner panel 27.

Then, the guide protrusions 26, 26 provided on the first connector 4 come into contact with the guide face 35a formed in the holder 21 and then, the first connector 4 is guided to a bottom portion of the holder 21 by the guide face 35a and the guide face 35b having an inclined face continuous therefrom. In this process, the connector pick-up portion 23 formed on the first connector 4 picks up an end portion of the second connector 20 supported movably around the supporting shafts 36, 36. Then, the second connector 20 is introduced into the connector engaging hole portion 10 formed in the first connector 4.

Because the opening width of the connector engaging hole portion 10 is formed large, the second connector 20 enters the connector engaging hole portion 10 smoothly. Further, the guide portions 25, 25 formed on the second connector 20 enter the guide grooves 24, 24 formed in the connector engaging hole portion 10.

Figure 21:
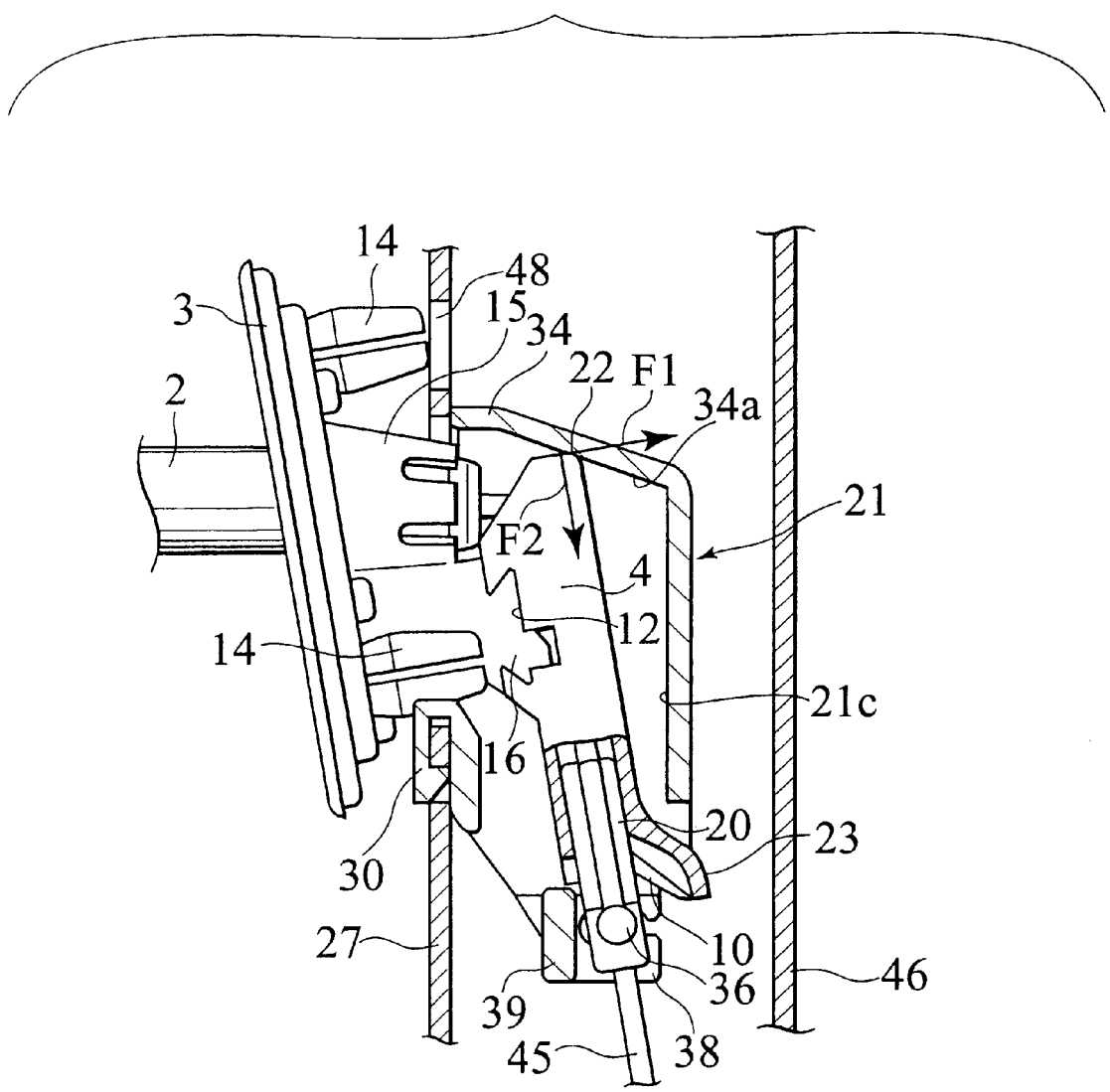
FIG. 21 is a sectional view of connector engagement halfway condition showing an operation for engaging the first connector coupled with the bracket with the second connector in the holder according to the embodiment.

Then, if the bracket 3 is pressed into the inner panel 27 further, as shown in FIG. 21, the connector insertion force reducing portion 22 of the first connector 4 comes into contact with the inner wall 34a of the inclined portion 34 formed in the holder 21.

Consequently, a connector coupling force F2 for engaging the first connector 4 with the second connector 20 is applied to the first connector 4 as a counterforce of component of pressing force F1 of the bracket 3 into the inner panel 27. Because this connector coupling force F2 is smaller than the pressing force F1, the insertion force of the first connector 4 into the second connector 20 is reduced.

As the first connector 4 is gradually pressed to the bottom portion of the holder 21, the second connector 20 gradually enters the connector engaging hole portion 10 of the first connector 4 by the connector coupling force F2.

On the other hand, three fixing members 14 formed on the bracket 3 enter the bracket fixing holes 48 formed in the inner panel 27 so that the bracket 3 is mounted on the inner panel 27.

Figure 22:
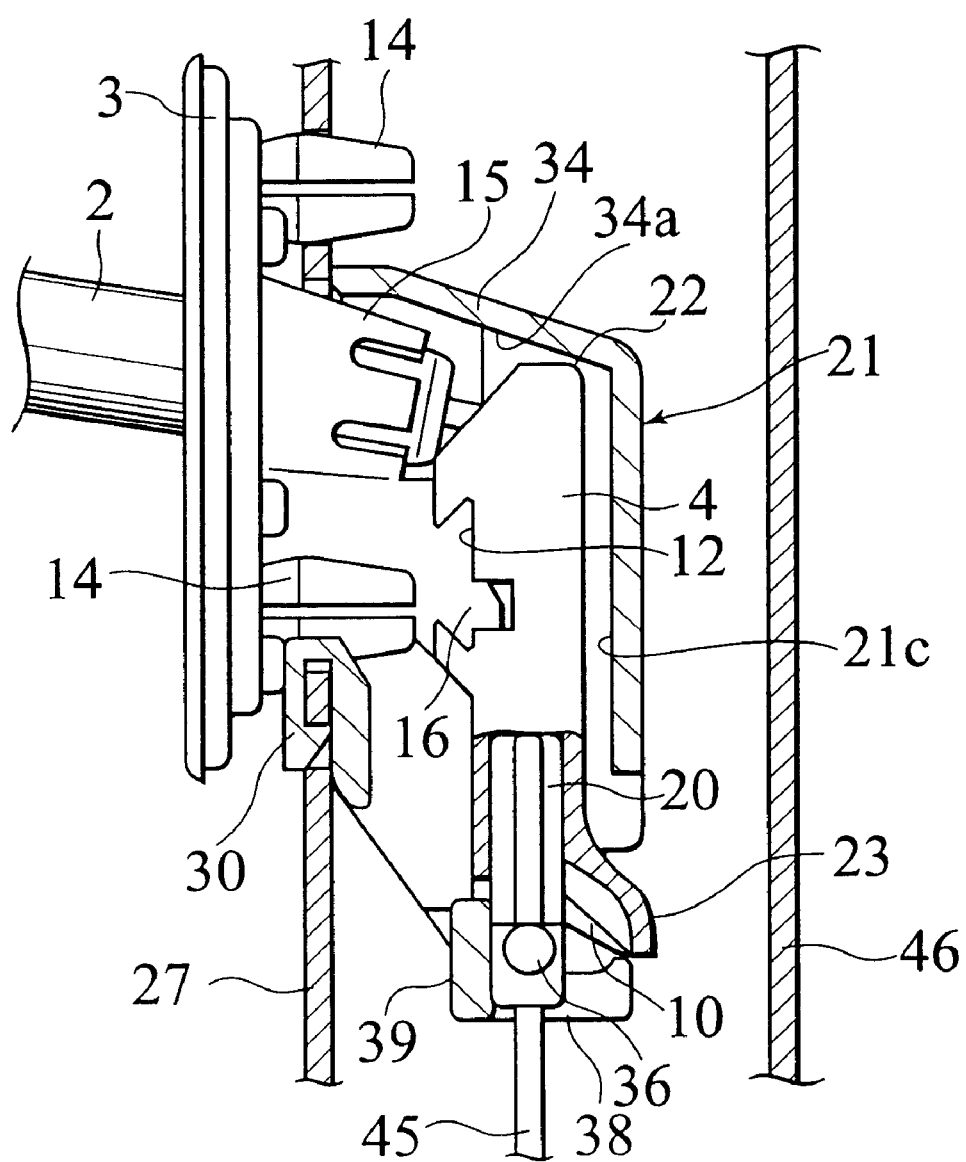
FIG. 22 is a sectional view of connector engagement completion condition showing an operation for engaging the first connector coupled with the bracket with the second connector in the holder according to the embodiment.

If the second connector 20 completely engages with the connector engaging hole portion 10, as shown in FIG. 22, the first connector 4 is kept horizontal with respect to the bottom face 21c of the holder 21 and there is a predetermined gap between the bottom face 21c and the holder 21. In such a condition, as shown in FIG. 24, the supporting shafts 36, 36 of the second connector 20 engage with the circular hole portions 37a, 37a of the supporting shaft guide holes 37, 37.

Figure 23:
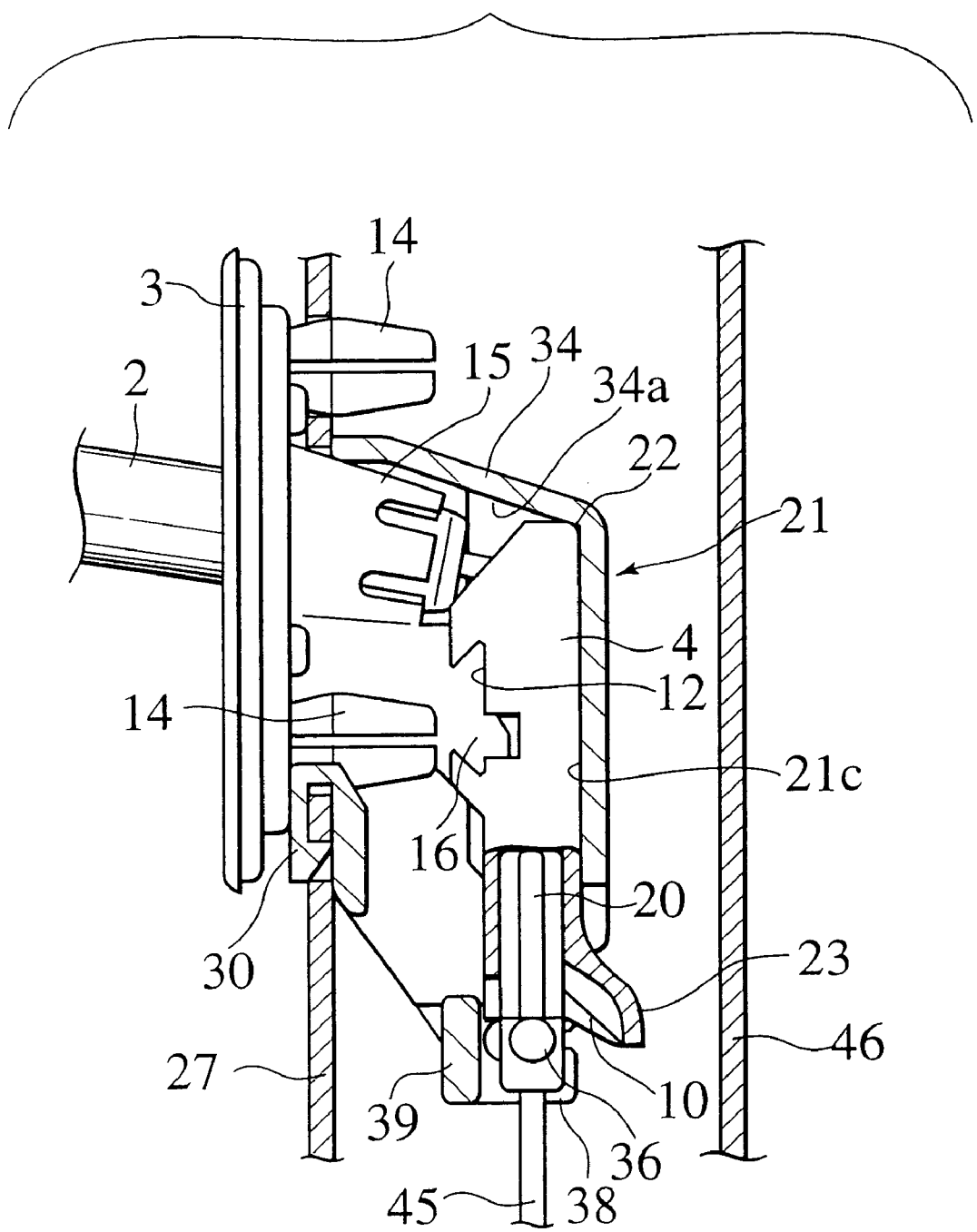
FIG. 23 is a sectional view of connector engagement ensuring condition showing an operation for engaging the first connector coupled with the bracket with the second connector in the holder according to the embodiment.

Then, if the bracket 3 is further pressed from this condition, as shown in FIG. 23, the first connector 4 comes into contact with the bottom face 21c of the holder 21. This condition is engagement ensuring condition.

The second connector 20 united with the first connector 4 moves to the bottom portion of the holder with the first connector 4. As a result, the supporting shafts 36, 36 engaging with the circular hole portions 37a, 37a move to the opening end of the supporting shaft guide holes 37, 37 formed in the holder 21 so that they move to the elongated hole portion 37b having a smaller width. Because the elongated hole portion 37b has a smaller width than the outside diameter of the supporting shafts 36, 36, if the supporting shafts 36, 36 enter the elongated hole portion 37, as shown in FIG. 25, the looseness preventing portion 38 is deformed within an elastic deformation region in a direction of enlarging the opening width of the supporting shaft guide holes 37, 37. Thus, the counterforce X is applied to the supporting shafts 36, 36 by the deformed looseness preventing portion 38 so that the second connector 20 is held without any looseness by the holder 21. Thus, an occurrence of abnormal noise by vibration is suppressed.

According to the connector coupling structure having such a structure, the first connector 4 can be coupled with the second connector 20 without visually making sure the coupling therebetween and without any manual operation of an operator at the same time when the bracket 3 is installed to the inner panel 27, so that the installation work can be reduced largely.

Further, because the inclined portion 34 which comes into contact with the connector insertion force reducing portion 22 of the first connector 4 and applies the connector coupling force F2 for urging the first connector 4 to the second connector 20 is formed on the holder 21, the insertion force between the first connector 4 and the second connector 20 is reduced by the connector coupling force F2, so that these connectors 4, 20 can be coupled with each other smoothly by a slight force.

Further, when the supporting shafts 36, 36 move from the circular hole portion 37a having substantially the same diameter as the outside diameter of the supporting shafts 36, 36, in the supporting shaft guide holes 37, 37 formed in the holder 21 and reach the elongated hole portion 37b having a smaller width, the looseness preventing portion 38 formed on the holder 21 is urged to press the supporting shafts 36, 36. As a result, the looseness preventing portion 38 suppresses an occurrence of looseness in the second connector 20. Therefore, an occurrence of abnormal noise by vibration can be prevented effectively.

In the connector coupling structure described above also, because the lead wire 10 is not exposed outside when the first connector 4 is coupled with the bracket 3, the lead wire can be prevented effectively from being bit by other components when the bracket 3 is installed to the inner panel 27.

Meanwhile, although according to this embodiment, the sun visor is used as an subsidiary device, the present invention is not restricted to this but it is needless to say that the present invention is applicable to other devices in which a connector is required to be supported and coupled under the same condition.

Additionally, needless to say, the present invention may be modified in various ways within a scope not departing from the technical philosophy of the present invention and carried out.

What is claimed is:

1. A connector supporting structure comprising:
   a connector having a connector housing in which a terminal is accommodated in a terminal accommodating chamber provided in the connector housing, the connector housing defining an engaging hole portion for receiving a mating connector to be connected with the terminal and also defining a concave portion formed from an outer side face of the connector housing up to a position leading to the terminal accommodating chamber; and
   a bracket having a convex portion configured to engage with the concave portion to position and unite the connector with the bracket and define an engagement axis passing through the concave portion, the convex portion, and the terminal accommodating chamber when the convex portion and the concave portion are engaged.

2. A connector supporting structure according to claim 1, wherein the convex portion engages with the terminal.

3. A connector supporting structure according to claim 1, wherein the concave portion engages with the convex portion by sliding in a direction substantially perpendicular to the engagement axis.

4. A connector supporting structure according to claim 1, wherein the concave portion has an inverted trapezoidal portion in which an opening width facing an outer side face of the connector housing gradually increases as the opening width goes inward.

5. A connector supporting structure according to claim 1, wherein a concavity of the concave portion faces the terminal accommodating chamber.

6. A connector supporting structure comprising:
   a connector having a connector housing in which a terminal is accommodated in a terminal accommodating chamber provided in the connector housing and a concave portion is formed from an outer side face of the connector housing up to a position leading to the terminal accommodating chamber; and
   a bracket having a convex portion engaging with the concave portion so as to position the connector and unite the connector therewith,
   wherein the bracket is provided at a front end of a fixing shaft supporting a sun visor and fixed to a vehicle body while a lead wire introduced from the fixing shaft is connected to the terminal.

7. A connector supporting structure according to claim 6, wherein a lead wire guide groove portion guiding the lead wire is provided at an end of the connector housing such that the lead wire guide groove portion is capable of opposing the front end of the fixing shaft at a near position thereof.

8. A connector coupling structure, comprising:
   a bracket fixing a subsidiary device to a panel;
   a first connector having a concave portion to be engaged with a convex portion formed on the bracket and to be united with the bracket by engaging the concave portion with the convex portion;
   a holder having an opening portion and to be mounted on a face at an opposite side to a face on which the bracket is mounted of a panel, the opening portion being positioned at a position corresponding to a bracket mounting hole formed in the panel so as to mount the bracket; and a second connector to be installed freely movably around a supporting shaft within the holder and coupled with the first connector, wherein
when the bracket united with the first connector is installed to the panel, the first connector is advanced into the holder through the opening portion and coupled with the second connector.

9. A connector coupling structure according to claim 8, wherein an end portion of the first connector on the side of the second connector has a connector pick-up portion introducing the second connector into a connector engaging hole portion in the first connector.

10. A connector coupling structure according to claim 8, wherein the first connector has a protrusion and the holder has a guide face provided on an inner wall thereof, while the first connector is advanced into the holder and introduced to the second connector by keeping the protrusion of the first connector in sliding contact with the guide face in the holder.

11. A connector coupling structure according to claim 8, wherein a lead wire introduced from the subsidiary device is connected to the terminal accommodated in the first connector through the bracket.

12. A connector coupling structure according to claim 8, wherein the bracket has a fixing member to be installed to the panel and the fixing member is of a substantially cylindrical form containing a part near a proximal end thereof having a larger diameter than the other part and including a slit dividing the substantially cylindrical form to two sections along a height thereof from a front end thereof up to a proximal end thereof.

13. A connector coupling structure according to claim 8, wherein the holder includes an applying portion applying a connector coupling force so as to urge the first connector to the second connector.

14. A connector coupling structure according to claim 13, wherein the applying portion is an inclined portion which comes into contact with an end portion on an opposite side to the second connector of the first connector so as to apply a connector coupling force so as to urge the first connector to the second connector.

15. A connector coupling structure according to claim 14, wherein the first connector is advanced into the holder by keeping the end portion in sliding contact with an inner wall of the inclined portion and coupled with the second connector.

16. A connector coupling structure according to claim 8, wherein a supporting shaft guide hole supporting the supporting shaft is comprised of a circular hole portion having substantially the same diameter as an outer diameter of the supporting shaft and an elongated hole portion whose width decreases as the elongated hole goes from the circular hole portion to an opening end thereof.

17. A connector coupling structure according to claim 16, wherein when the bracket is installed to the panel, the supporting shaft reaches the elongated hole portion and the supporting shaft is urged and pressed against the supporting shaft guide hole.

18. A connector coupling structure according to claim 16, wherein the supporting shaft guide hole functions as a looseness preventing portion for the supporting shaft.

* * * * *